United States Patent
Nock et al.

(10) Patent No.: US 9,249,809 B2
(45) Date of Patent: *Feb. 2, 2016

(54) FAN

(71) Applicant: Dyson Technology Limited, Wiltshire, GA (US)

(72) Inventors: Ian Robert Nock, Malmesbury (GB); Benjamin Stephen Warnes, Malmesbury (GB); Kevin John Simmonds, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 435 days.

This patent is subject to a terminal disclaimer.

(21) Appl. No.: 13/760,640

(22) Filed: Feb. 6, 2013

(65) Prior Publication Data

US 2013/0202412 A1 Aug. 8, 2013

(30) Foreign Application Priority Data

Feb. 6, 2012 (GB) .................................. 1202004.6

(51) Int. Cl.
*F04D 29/70* (2006.01)
*B03C 3/32* (2006.01)
*F04F 5/16* (2006.01)
*B03C 3/08* (2006.01)
(Continued)

(52) U.S. Cl.
CPC ................ *F04D 29/703* (2013.01); *B03C 3/08* (2013.01); *B03C 3/32* (2013.01); *B03C 3/368* (2013.01); *B03C 3/383* (2013.01); *F04F 5/16* (2013.01); *F24F 3/166* (2013.01); *F24F 2003/1682* (2013.01)

(58) Field of Classification Search
CPC ............ B03C 3/08; B03C 3/09; B03C 3/014; B03C 3/32; B03C 3/36; B03C 3/368; B03C 3/383; F04D 25/08; F04D 29/403; F04D 29/411; F04D 29/703
USPC ........................................................ 415/213.1
See application file for complete search history.

(56) References Cited

U.S. PATENT DOCUMENTS

| | | |
|---|---|---|
| 284,962 A | 9/1883 | Huston |
| 1,357,261 A | 11/1920 | Svoboda |

(Continued)

FOREIGN PATENT DOCUMENTS

| | | |
|---|---|---|
| BE | 560119 | 8/1957 |
| CA | 1055344 | 5/1979 |

(Continued)

OTHER PUBLICATIONS

International Search Report mailed Apr. 15, 2013, directed to International PCT/GB2013/050022; 6 pages.

(Continued)

*Primary Examiner* — Igor Kershteyn
*Assistant Examiner* — Woody A Lee, Jr.
(74) *Attorney, Agent, or Firm* — Morrison & Foerster LLP

(57) ABSTRACT

A fan includes a base and a nozzle mounted on the base. The base includes an impeller and a motor for driving the impeller to generate an air flow. The nozzle includes an air inlet, an air outlet, and an annular casing which defines a bore through which air from outside the fan is drawn by air emitted from the air outlet. An electrostatic precipitator is located within the bore of the nozzle for treating the air drawn through the bore.

21 Claims, 13 Drawing Sheets

(51) Int. Cl.
  *B03C 3/36* (2006.01)
  *B03C 3/38* (2006.01)
  *F24F 3/16* (2006.01)

(56) References Cited

U.S. PATENT DOCUMENTS

| | | | |
|---|---|---|---|
| 1,767,060 A | 6/1930 | Ferguson | |
| 1,896,869 A | 2/1933 | Larsh | |
| 2,014,185 A | 9/1935 | Martin | |
| 2,035,733 A | 3/1936 | Wall | |
| 2,071,266 A | 2/1937 | Schmidt | |
| D103,476 S | 3/1937 | Weber | |
| 2,115,883 A | 5/1938 | Sher | |
| D115,344 S | 6/1939 | Chapman | |
| 2,210,458 A | 8/1940 | Keilholtz | |
| 2,258,961 A | 10/1941 | Saathoff | |
| 2,295,502 A | 9/1942 | Lamb | |
| 2,336,295 A | 12/1943 | Reimuller | |
| 2,363,839 A | 11/1944 | Demuth | |
| 2,433,795 A | 12/1947 | Stokes | |
| 2,473,325 A | 6/1949 | Aufiero | |
| 2,476,002 A | 7/1949 | Stalker | |
| 2,488,467 A * | 11/1949 | De Lisio | 239/561 |
| 2,510,132 A | 6/1950 | Morrison | |
| 2,544,379 A | 3/1951 | Davenport | |
| 2,547,448 A | 4/1951 | Demuth | |
| 2,583,374 A | 1/1952 | Hoffman | |
| 2,620,127 A | 12/1952 | Radcliffe | |
| 2,711,682 A | 6/1955 | Drechsel | |
| 2,765,977 A | 10/1956 | Morrison | |
| 2,808,198 A | 10/1957 | Morrison | |
| 2,813,673 A | 11/1957 | Smith | |
| 2,830,779 A | 4/1958 | Wentling | |
| 2,838,229 A | 6/1958 | Belanger | |
| 2,922,277 A | 1/1960 | Bertin | |
| 2,922,570 A | 1/1960 | Allen | |
| 3,004,403 A | 10/1961 | Laporte | |
| 3,047,208 A | 7/1962 | Coanda | |
| 3,270,655 A | 9/1966 | Guirl et al. | |
| D206,973 S | 2/1967 | De Lisio | |
| 3,503,138 A | 3/1970 | Fuchs et al. | |
| 3,518,776 A | 7/1970 | Wolff et al. | |
| 3,724,092 A | 4/1973 | McCleerey | |
| 3,729,934 A | 5/1973 | Denning et al. | |
| 3,743,186 A | 7/1973 | Mocarski | |
| 3,795,367 A | 3/1974 | Mocarski | |
| 3,872,916 A | 3/1975 | Beck | |
| 3,875,745 A | 4/1975 | Franklin | |
| 3,885,891 A | 5/1975 | Throndson | |
| 3,943,329 A | 3/1976 | Hlavac | |
| 4,037,991 A | 7/1977 | Taylor | |
| 4,046,492 A | 9/1977 | Inglis | |
| 4,061,188 A | 12/1977 | Beck | |
| 4,073,613 A | 2/1978 | Desty | |
| 4,090,814 A | 5/1978 | Teodorescu et al. | |
| 4,113,416 A | 9/1978 | Kataoka et al. | |
| 4,136,735 A | 1/1979 | Beck et al. | |
| 4,173,995 A | 11/1979 | Beck | |
| 4,180,130 A | 12/1979 | Beck et al. | |
| 4,184,417 A | 1/1980 | Chancellor | |
| 4,184,541 A | 1/1980 | Beck et al. | |
| 4,192,461 A | 3/1980 | Arborg | |
| 4,231,766 A | 11/1980 | Spurgin | |
| 4,332,529 A | 6/1982 | Alperin | |
| 4,336,017 A | 6/1982 | Desty | |
| 4,342,204 A | 8/1982 | Melikian et al. | |
| 4,448,354 A | 5/1984 | Reznick et al. | |
| 4,568,243 A | 2/1986 | Schubert et al. | |
| 4,630,475 A | 12/1986 | Mizoguchi | |
| 4,643,351 A | 2/1987 | Fukamachi et al. | |
| 4,703,152 A | 10/1987 | Shih-Chin | |
| 4,718,870 A | 1/1988 | Watts | |
| 4,732,539 A | 3/1988 | Shin-Chin | |
| 4,734,017 A | 3/1988 | Levin | |
| 4,790,133 A | 12/1988 | Stuart | |
| 4,850,804 A | 7/1989 | Huang | |
| 4,878,620 A | 11/1989 | Tarleton | |
| 4,893,990 A | 1/1990 | Tomohiro et al. | |
| 4,978,281 A | 12/1990 | Conger | |
| 5,024,685 A | 6/1991 | Török et al. | |
| 5,061,405 A | 10/1991 | Stanek et al. | |
| D325,435 S | 4/1992 | Coup et al. | |
| 5,110,266 A | 5/1992 | Toyoshima et al. | |
| 5,168,722 A | 12/1992 | Brock | |
| 5,176,856 A | 1/1993 | Takahashi et al. | |
| 5,188,508 A | 2/1993 | Scott et al. | |
| 5,296,769 A | 3/1994 | Havens et al. | |
| 5,310,313 A | 5/1994 | Chen | |
| 5,317,815 A | 6/1994 | Hwang | |
| 5,402,938 A | 4/1995 | Sweeney | |
| 5,407,324 A | 4/1995 | Starnes, Jr. et al. | |
| 5,425,902 A | 6/1995 | Miller et al. | |
| 5,435,489 A | 7/1995 | Jenkins et al. | |
| 5,518,370 A | 5/1996 | Wang et al. | |
| 5,609,473 A | 3/1997 | Litvin | |
| 5,645,769 A | 7/1997 | Tamaru et al. | |
| 5,649,370 A | 7/1997 | Russo | |
| 5,671,321 A | 9/1997 | Bagnuolo | |
| 5,735,683 A | 4/1998 | Muschelknautz | |
| 5,762,034 A | 6/1998 | Foss | |
| 5,762,661 A | 6/1998 | Kleinberger et al. | |
| 5,783,117 A | 7/1998 | Byassee et al. | |
| 5,794,306 A | 8/1998 | Firdaus | |
| D398,983 S | 9/1998 | Keller et al. | |
| 5,841,080 A | 11/1998 | Iida et al. | |
| 5,843,344 A | 12/1998 | Junket et al. | |
| 5,862,037 A | 1/1999 | Behl | |
| 5,868,197 A | 2/1999 | Potier | |
| 5,881,685 A | 3/1999 | Foss et al. | |
| D415,271 S | 10/1999 | Feer | |
| 6,015,274 A | 1/2000 | Bias et al. | |
| 6,073,881 A | 6/2000 | Chen | |
| D429,808 S | 8/2000 | Krauss et al. | |
| 6,109,054 A | 8/2000 | Han | |
| 6,123,618 A | 9/2000 | Day | |
| 6,155,782 A | 12/2000 | Hsu | |
| D435,899 S | 1/2001 | Melwani | |
| 6,254,337 B1 | 7/2001 | Arnold | |
| 6,269,549 B1 | 8/2001 | Carlucci et al. | |
| 6,278,248 B1 | 8/2001 | Hong et al. | |
| 6,282,746 B1 | 9/2001 | Schleeter | |
| 6,293,121 B1 | 9/2001 | Labrador | |
| 6,321,034 B2 | 11/2001 | Jones-Lawlor et al. | |
| 6,386,845 B1 | 5/2002 | Bedard | |
| 6,480,672 B1 | 11/2002 | Rosenzweig et al. | |
| 6,599,088 B2 | 7/2003 | Stagg | |
| 6,604,694 B1 | 8/2003 | Kordas et al. | |
| D485,895 S | 1/2004 | Melwani | |
| 6,789,787 B2 | 9/2004 | Stutts | |
| 6,791,056 B2 | 9/2004 | VanOtteren et al. | |
| 6,830,433 B2 | 12/2004 | Birdsell et al. | |
| 7,059,826 B2 | 6/2006 | Lasko | |
| 7,088,913 B1 | 8/2006 | Verhoorn et al. | |
| 7,147,336 B1 | 12/2006 | Chou | |
| D539,414 S | 3/2007 | Russak et al. | |
| 7,192,258 B2 | 3/2007 | Kuo et al. | |
| 7,198,473 B2 | 4/2007 | Stickland et al. | |
| 7,244,290 B2 | 7/2007 | Vandenbelt et al. | |
| 7,412,781 B2 | 8/2008 | Mattinger et al. | |
| 7,478,993 B2 | 1/2009 | Hong et al. | |
| 7,540,474 B1 | 6/2009 | Huang et al. | |
| D598,532 S | 8/2009 | Dyson et al. | |
| D602,143 S | 10/2009 | Gammack et al. | |
| D602,144 S | 10/2009 | Dyson et al. | |
| 7,621,984 B2 | 11/2009 | Cowie et al. | |
| D605,748 S | 12/2009 | Gammack et al. | |
| 7,660,110 B2 | 2/2010 | Vinson et al. | |
| 7,664,377 B2 | 2/2010 | Liao | |
| D614,280 S | 4/2010 | Dyson et al. | |
| 7,731,050 B2 | 6/2010 | Parks et al. | |
| 7,775,848 B1 | 8/2010 | Auerbach | |
| 7,806,388 B2 | 10/2010 | Junkel et al. | |
| 7,841,045 B2 | 11/2010 | Shaanan et al. | |
| 7,875,104 B2 | 1/2011 | Cowie et al. | |

(56) References Cited

U.S. PATENT DOCUMENTS

| | | | |
|---|---|---|---|
| 7,931,449 B2 | 4/2011 | Fitton et al. | |
| 7,972,111 B2 | 7/2011 | Crawford et al. | |
| 8,002,520 B2 | 8/2011 | Dawson et al. | |
| 8,052,379 B2 | 11/2011 | Gammack | |
| 8,092,166 B2 | 1/2012 | Nicolas et al. | |
| 8,113,490 B2 | 2/2012 | Chen | |
| 8,152,495 B2 | 4/2012 | Boggess, Jr. et al. | |
| 8,197,226 B2 | 6/2012 | Fitton et al. | |
| 8,246,317 B2 | 8/2012 | Gammack | |
| 8,308,432 B2 | 11/2012 | Crawford et al. | |
| 8,308,445 B2 | 11/2012 | Gammack et al. | |
| 8,348,629 B2 | 1/2013 | Fitton et al. | |
| 8,356,804 B2 | 1/2013 | Fitton et al. | |
| 8,366,403 B2 | 2/2013 | Wallace et al. | |
| 8,403,640 B2 | 3/2013 | Gammack et al. | |
| 8,403,650 B2 | 3/2013 | Gammack et al. | |
| 8,430,624 B2 | 4/2013 | Cookson et al. | |
| 8,454,322 B2 | 6/2013 | Gammack et al. | |
| 8,469,658 B2 | 6/2013 | Gammack et al. | |
| 8,469,660 B2 | 6/2013 | Dyson et al. | |
| 8,529,226 B2 | 9/2013 | Li | |
| 8,544,826 B2 | 10/2013 | Ediger et al. | |
| 8,613,601 B2 * | 12/2013 | Helps | 417/76 |
| 8,721,286 B2 | 5/2014 | Gammack et al. | |
| 8,721,307 B2 | 5/2014 | Li | |
| 8,734,121 B2 | 5/2014 | Tsen | |
| 8,873,940 B2 | 10/2014 | Wallace et al. | |
| 8,882,451 B2 | 11/2014 | Fitton et al. | |
| 2002/0106547 A1 | 8/2002 | Sugawara et al. | |
| 2003/0005824 A1 | 1/2003 | Katou et al. | |
| 2003/0059307 A1 | 3/2003 | Moreno et al. | |
| 2003/0164367 A1 | 9/2003 | Bucher et al. | |
| 2003/0171093 A1 | 9/2003 | Gumucio Del Pozo | |
| 2003/0190183 A1 | 10/2003 | Hsing | |
| 2004/0022631 A1 | 2/2004 | Birdsell et al. | |
| 2004/0049842 A1 | 3/2004 | Prehodka | |
| 2004/0106370 A1 | 6/2004 | Honda et al. | |
| 2004/0149881 A1 | 8/2004 | Allen | |
| 2005/0031448 A1 | 2/2005 | Lasko et al. | |
| 2005/0053465 A1 | 3/2005 | Roach et al. | |
| 2005/0069407 A1 | 3/2005 | Winkler et al. | |
| 2005/0128698 A1 | 6/2005 | Huang | |
| 2005/0163670 A1 | 7/2005 | Alleyne et al. | |
| 2005/0173997 A1 | 8/2005 | Schmid et al. | |
| 2005/0281672 A1 | 12/2005 | Parker et al. | |
| 2006/0107834 A1 | 5/2006 | Vandenbelt et al. | |
| 2006/0172682 A1 | 8/2006 | Orr et al. | |
| 2006/0199515 A1 | 9/2006 | Lasko et al. | |
| 2006/0263073 A1 | 11/2006 | Clarke et al. | |
| 2006/0279927 A1 | 12/2006 | Strohm | |
| 2007/0035189 A1 | 2/2007 | Matsumoto | |
| 2007/0041857 A1 | 2/2007 | Fleig | |
| 2007/0065280 A1 | 3/2007 | Fok | |
| 2007/0166160 A1 | 7/2007 | Russak et al. | |
| 2007/0176502 A1 | 8/2007 | Kasai et al. | |
| 2007/0224044 A1 | 9/2007 | Hong et al. | |
| 2007/0269323 A1 | 11/2007 | Zhou et al. | |
| 2008/0020698 A1 | 1/2008 | Spaggiari | |
| 2008/0124060 A1 | 5/2008 | Gao | |
| 2008/0152482 A1 | 6/2008 | Patel | |
| 2008/0166224 A1 | 7/2008 | Giffin | |
| 2008/0286130 A1 | 11/2008 | Purvines | |
| 2008/0314250 A1 | 12/2008 | Cowie et al. | |
| 2009/0026850 A1 | 1/2009 | Fu | |
| 2009/0032130 A1 | 2/2009 | Dumas et al. | |
| 2009/0039805 A1 | 2/2009 | Tang | |
| 2009/0060710 A1 | 3/2009 | Gammack et al. | |
| 2009/0060711 A1 | 3/2009 | Gammack et al. | |
| 2009/0078120 A1 | 3/2009 | Kummer et al. | |
| 2009/0120925 A1 | 5/2009 | Lasko | |
| 2009/0191054 A1 | 7/2009 | Winkler | |
| 2009/0207547 A1 * | 8/2009 | Terasaki | 361/231 |
| 2009/0214341 A1 | 8/2009 | Craig | |
| 2010/0031823 A1 * | 2/2010 | Cowie et al. | 96/44 |
| 2010/0133707 A1 | 6/2010 | Huang | |
| 2010/0150699 A1 | 6/2010 | Nicolas et al. | |
| 2010/0162011 A1 | 6/2010 | Min | |
| 2010/0171465 A1 | 7/2010 | Seal et al. | |
| 2010/0225012 A1 | 9/2010 | Fitton et al. | |
| 2010/0226749 A1 | 9/2010 | Gammack et al. | |
| 2010/0226750 A1 | 9/2010 | Gammack | |
| 2010/0226751 A1 | 9/2010 | Gammack et al. | |
| 2010/0226752 A1 | 9/2010 | Gammack et al. | |
| 2010/0226753 A1 | 9/2010 | Dyson et al. | |
| 2010/0226754 A1 | 9/2010 | Hutton et al. | |
| 2010/0226758 A1 | 9/2010 | Cookson et al. | |
| 2010/0226763 A1 | 9/2010 | Gammack et al. | |
| 2010/0226764 A1 | 9/2010 | Gammack et al. | |
| 2010/0226769 A1 | 9/2010 | Helps | |
| 2010/0226771 A1 | 9/2010 | Crawford et al. | |
| 2010/0226787 A1 | 9/2010 | Gammack et al. | |
| 2010/0226797 A1 | 9/2010 | Fitton et al. | |
| 2010/0226801 A1 | 9/2010 | Gammack | |
| 2010/0254800 A1 | 10/2010 | Fitton et al. | |
| 2011/0033346 A1 | 2/2011 | Bohlen et al. | |
| 2011/0058935 A1 | 3/2011 | Gammack et al. | |
| 2011/0110805 A1 | 5/2011 | Gammack et al. | |
| 2011/0164959 A1 | 7/2011 | Fitton et al. | |
| 2011/0223014 A1 | 9/2011 | Crawford et al. | |
| 2011/0223015 A1 | 9/2011 | Gammack et al. | |
| 2011/0236228 A1 | 9/2011 | Fitton et al. | |
| 2011/0236229 A1 | 9/2011 | Fitton et al. | |
| 2012/0031509 A1 | 2/2012 | Wallace et al. | |
| 2012/0033952 A1 | 2/2012 | Wallace et al. | |
| 2012/0034108 A1 | 2/2012 | Wallace et al. | |
| 2012/0039705 A1 | 2/2012 | Gammack | |
| 2012/0045315 A1 | 2/2012 | Gammack | |
| 2012/0045316 A1 | 2/2012 | Gammack | |
| 2012/0051884 A1 | 3/2012 | Junkel et al. | |
| 2012/0057959 A1 | 3/2012 | Hodgson et al. | |
| 2012/0082561 A1 | 4/2012 | Gammack et al. | |
| 2012/0093629 A1 | 4/2012 | Fitton et al. | |
| 2012/0093630 A1 | 4/2012 | Fitton et al. | |
| 2012/0114513 A1 | 5/2012 | Simmonds et al. | |
| 2012/0230658 A1 | 9/2012 | Fitton et al. | |
| 2012/0308375 A1 | 12/2012 | Gammack | |
| 2012/0318392 A1 | 12/2012 | Li | |
| 2013/0026664 A1 | 1/2013 | Staniforth et al. | |
| 2013/0028763 A1 | 1/2013 | Staniforth et al. | |
| 2013/0028766 A1 | 1/2013 | Staniforth et al. | |
| 2013/0047857 A1 * | 2/2013 | Bohlen | 96/18 |
| 2013/0047858 A1 * | 2/2013 | Bohlen et al. | 96/75 |
| 2013/0129490 A1 | 5/2013 | Dos Reis et al. | |
| 2013/0161842 A1 | 6/2013 | Fitton et al. | |
| 2013/0199372 A1 | 8/2013 | Nock et al. | |
| 2013/0202413 A1 | 8/2013 | Nock et al. | |
| 2013/0272858 A1 | 10/2013 | Stickney et al. | |
| 2013/0280051 A1 | 10/2013 | Nicolas et al. | |
| 2013/0280061 A1 | 10/2013 | Stickney | |
| 2013/0280096 A1 | 10/2013 | Gammack et al. | |
| 2013/0323100 A1 | 12/2013 | Poulton et al. | |
| 2014/0079566 A1 | 3/2014 | Gammack et al. | |
| 2014/0084492 A1 | 3/2014 | Staniforth et al. | |
| 2014/0210114 A1 | 7/2014 | Staniforth et al. | |
| 2014/0255173 A1 * | 9/2014 | Poulton et al. | 415/182.1 |
| 2014/0255217 A1 | 9/2014 | Li | |
| 2015/0093098 A1 * | 4/2015 | Fitton et al. | 392/367 |

FOREIGN PATENT DOCUMENTS

| | | |
|---|---|---|
| CA | 2155482 | 9/1996 |
| CH | 346643 | 5/1960 |
| CN | 2085866 | 10/1991 |
| CN | 2111392 | 7/1992 |
| CN | 1364100 | 8/2002 |
| CN | 1437300 | 8/2003 |
| CN | 2650005 | 10/2004 |
| CN | 2713643 | 7/2005 |
| CN | 1680727 | 10/2005 |
| CN | 2833197 | 11/2006 |
| CN | 101057380 | 10/2007 |
| CN | 201011346 | 1/2008 |
| CN | 201180678 | 1/2009 |
| CN | 201221477 | 4/2009 |

(56) References Cited

FOREIGN PATENT DOCUMENTS

| | | |
|---|---|---|
| CN | 101424279 | 5/2009 |
| CN | 101451754 | 6/2009 |
| CN | 201281416 | 7/2009 |
| CN | 201349269 | 11/2009 |
| CN | 101684828 | 3/2010 |
| CN | 201486901 | 5/2010 |
| CN | 101749288 | 6/2010 |
| CN | 201502549 | 6/2010 |
| CN | 201507461 | 6/2010 |
| CN | 101825096 | 9/2010 |
| CN | 101825101 | 9/2010 |
| CN | 101825102 | 9/2010 |
| CN | 101825103 | 9/2010 |
| CN | 101825104 | 9/2010 |
| CN | 201568337 | 9/2010 |
| CN | 101858355 | 10/2010 |
| CN | 101936310 | 1/2011 |
| CN | 201696365 | 1/2011 |
| CN | 201696366 | 1/2011 |
| CN | 201739199 | 2/2011 |
| CN | 101984299 | 3/2011 |
| CN | 101985948 | 3/2011 |
| CN | 201763705 | 3/2011 |
| CN | 201763706 | 3/2011 |
| CN | 201770513 | 3/2011 |
| CN | 201771875 | 3/2011 |
| CN | 201779080 | 3/2011 |
| CN | 201786777 | 4/2011 |
| CN | 201786778 | 4/2011 |
| CN | 201802648 | 4/2011 |
| CN | 102095236 | 6/2011 |
| CN | 201858204 | 6/2011 |
| CN | 201874898 | 6/2011 |
| CN | 201874901 | 6/2011 |
| CN | 201917047 | 8/2011 |
| CN | 102251973 | 11/2011 |
| CN | 102287357 | 12/2011 |
| CN | 102367813 | 3/2012 |
| CN | 202267207 | 6/2012 |
| CN | 202431623 | 9/2012 |
| DE | 1 291 090 | 3/1969 |
| DE | 24 51 557 | 5/1976 |
| DE | 27 48 724 | 5/1978 |
| DE | 3644567 | 7/1988 |
| DE | 195 10 397 | 9/1996 |
| DE | 197 12 228 | 10/1998 |
| DE | 100 00 400 | 3/2001 |
| DE | 10041805 | 6/2002 |
| DE | 10 2009 007 037 | 8/2010 |
| EP | 0 044 494 | 1/1982 |
| EP | 0 186 581 | 7/1986 |
| EP | 0 784 947 | 7/1997 |
| EP | 1 094 224 | 4/2001 |
| EP | 1 138 954 | 10/2001 |
| EP | 1357296 | 10/2003 |
| EP | 1 779 745 | 5/2007 |
| EP | 1 939 456 | 7/2008 |
| EP | 1 980 432 | 10/2008 |
| EP | 2 000 675 | 12/2008 |
| EP | 2191142 | 6/2010 |
| EP | 2 578 889 | 4/2013 |
| FR | 1033034 | 7/1953 |
| FR | 1119439 | 6/1956 |
| FR | 1.387.334 | 1/1965 |
| FR | 2 281 543 | 3/1976 |
| FR | 2 375 471 | 7/1978 |
| FR | 2 534 983 | 4/1984 |
| FR | 2 640 857 | 6/1990 |
| FR | 2 658 593 | 8/1991 |
| FR | 2794195 | 12/2000 |
| FR | 2 874 409 | 2/2006 |
| FR | 2 906 980 | 4/2008 |
| FR | 2928706 | 9/2009 |
| GB | 22235 | 6/1914 |
| GB | 383498 | 11/1932 |
| GB | 593828 | 10/1947 |
| GB | 601222 | 4/1948 |
| GB | 633273 | 12/1949 |
| GB | 641622 | 8/1950 |
| GB | 661747 | 11/1951 |
| GB | 863124 | 3/1961 |
| GB | 1067956 | 5/1967 |
| GB | 1 262 131 | 2/1972 |
| GB | 1 265 341 | 3/1972 |
| GB | 1 278 606 | 6/1972 |
| GB | 1 304 560 | 1/1973 |
| GB | 1 403 188 | 8/1975 |
| GB | 1 434 226 | 5/1976 |
| GB | 1 435 520 | 5/1976 |
| GB | 1 501 473 | 2/1978 |
| GB | 2 094 400 | 9/1982 |
| GB | 2 107 787 | 5/1983 |
| GB | 2 111 125 | 6/1983 |
| GB | 2 178 256 | 2/1987 |
| GB | 2 185 531 | 7/1987 |
| GB | 2 185 533 | 7/1987 |
| GB | 2 218 196 | 11/1989 |
| GB | 2 236 804 | 4/1991 |
| GB | 2 240 268 | 7/1991 |
| GB | 2 242 935 | 10/1991 |
| GB | 2 285 504 | 7/1995 |
| GB | 2 289 087 | 11/1995 |
| GB | 2383277 | 6/2003 |
| GB | 2 428 569 | 2/2007 |
| GB | 2 452 593 | 3/2009 |
| GB | 2452490 | 3/2009 |
| GB | 2463698 | 3/2010 |
| GB | 2464736 | 4/2010 |
| GB | 2466058 | 6/2010 |
| GB | 2468312 | 9/2010 |
| GB | 2468313 | 9/2010 |
| GB | 2468315 | 9/2010 |
| GB | 2468317 | 9/2010 |
| GB | 2468319 | 9/2010 |
| GB | 2468320 | 9/2010 |
| GB | 2468323 | 9/2010 |
| GB | 2468328 | 9/2010 |
| GB | 2468331 | 9/2010 |
| GB | 2468369 | 9/2010 |
| GB | 2468498 | 9/2010 |
| GB | 2473037 | 3/2011 |
| GB | 2479760 | 10/2011 |
| GB | 2479760 A * | 10/2011 |
| GB | 2482547 | 2/2012 |
| GB | 2484671 | 4/2012 |
| GB | 2484695 | 4/2012 |
| GB | 2484761 | 4/2012 |
| GB | 2493231 | 1/2013 |
| GB | 2493505 | 2/2013 |
| GB | 2493507 | 2/2013 |
| GB | 2499044 | 8/2013 |
| GB | 2500011 | 9/2013 |
| JP | 31-13055 | 8/1956 |
| JP | 35-4369 | 3/1960 |
| JP | 39-7297 | 3/1964 |
| JP | 46-7230 | 12/1971 |
| JP | 49-150403 | 12/1974 |
| JP | 51-7258 | 1/1976 |
| JP | 53-60100 | 5/1978 |
| JP | 56-167897 | 12/1981 |
| JP | 57-71000 | 5/1982 |
| JP | 57-157097 | 9/1982 |
| JP | 61-1699 | 1/1986 |
| JP | 61-31830 | 2/1986 |
| JP | 61-116093 | 6/1986 |
| JP | 61-280787 | 12/1986 |
| JP | 62-223494 | 10/1987 |
| JP | 63-36794 | 3/1988 |
| JP | 63-179198 | 7/1988 |
| JP | 63-306340 | 12/1988 |
| JP | 64-21300 | 2/1989 |
| JP | 64-58955 | 3/1989 |
| JP | 64-83884 | 3/1989 |
| JP | 1-138399 | 5/1989 |

(56) References Cited

FOREIGN PATENT DOCUMENTS

| | | |
|---|---|---|
| JP | 1-224598 | 9/1989 |
| JP | 2-146294 | 6/1990 |
| JP | 2-218890 | 8/1990 |
| JP | 2-248690 | 10/1990 |
| JP | 3-52515 | 5/1991 |
| JP | 3-267598 | 11/1991 |
| JP | 3-286775 | 12/1991 |
| JP | 4-43895 | 2/1992 |
| JP | 4-366330 | 12/1992 |
| JP | 5-157093 | 6/1993 |
| JP | 5-164089 | 6/1993 |
| JP | 5-263786 | 10/1993 |
| JP | 6-74190 | 3/1994 |
| JP | 6-86898 | 3/1994 |
| JP | 6-147188 | 5/1994 |
| JP | 6-257591 | 9/1994 |
| JP | 6-280800 | 10/1994 |
| JP | 6-336113 | 12/1994 |
| JP | 7-190443 | 7/1995 |
| JP | 8-21400 | 1/1996 |
| JP | 8-72525 | 3/1996 |
| JP | 9-100800 | 4/1997 |
| JP | 9-178083 | 7/1997 |
| JP | 9-287600 | 11/1997 |
| JP | 11-502586 | 3/1999 |
| JP | 11-227866 | 8/1999 |
| JP | 2000-116179 | 4/2000 |
| JP | 2000-201723 | 7/2000 |
| JP | 2001-17358 | 1/2001 |
| JP | 2002-21797 | 1/2002 |
| JP | 2002-138829 | 5/2002 |
| JP | 2002-213388 | 7/2002 |
| JP | 2003-329273 | 11/2003 |
| JP | 2004-8275 | 1/2004 |
| JP | 2004-208935 | 7/2004 |
| JP | 2004-216221 | 8/2004 |
| JP | 2005-201507 | 7/2005 |
| JP | 2005-307985 | 11/2005 |
| JP | 2006-89096 | 4/2006 |
| JP | 3127331 | 11/2006 |
| JP | 2007-138763 | 6/2007 |
| JP | 2007-138789 | 6/2007 |
| JP | 2008-39316 | 2/2008 |
| JP | 2008-100204 | 5/2008 |
| JP | 3146538 | 10/2008 |
| JP | 2008-294243 | 12/2008 |
| JP | 2009-44568 | 2/2009 |
| JP | 2009-62986 | 3/2009 |
| JP | 2010-131259 | 6/2010 |
| JP | 2010-203441 | 9/2010 |
| JP | 2010-203764 | 9/2010 |
| JP | 2011-224470 | 11/2011 |
| JP | 2012-31806 | 2/2012 |
| KR | 1999-002660 | 1/1999 |
| KR | 10-2005-0102317 | 10/2005 |
| KR | 10-2007-0007997 | 1/2007 |
| KR | 20-0448319 | 3/2010 |
| KR | 10-2010-0055611 | 5/2010 |
| KR | 10-0985378 | 9/2010 |
| TW | 517825 | 1/2003 |
| TW | 589932 | 6/2004 |
| TW | M394383 | 12/2010 |
| TW | M399207 | 3/2011 |
| TW | M407299 | 7/2011 |
| WO | WO-90/13478 | 11/1990 |
| WO | WO-95/06822 | 3/1995 |
| WO | WO-95/19225 | 7/1995 |
| WO | WO-02/073096 | 9/2002 |
| WO | WO-03/058795 | 7/2003 |
| WO | WO-03/069931 | 8/2003 |
| WO | WO-2005/050026 | 6/2005 |
| WO | WO-2005/057091 | 6/2005 |
| WO | WO-2006/008021 | 1/2006 |
| WO | WO-2006/012526 | 2/2006 |
| WO | WO-2007/024955 | 3/2007 |
| WO | WO-2007/048205 | 5/2007 |
| WO | WO-2008/014641 | 2/2008 |
| WO | WO-2008/024569 | 2/2008 |
| WO | WO-2008/139491 | 11/2008 |
| WO | WO-2009/030879 | 3/2009 |
| WO | WO-2009/030881 | 3/2009 |
| WO | WO-2010/046691 | 4/2010 |
| WO | WO-2010/100448 | 9/2010 |
| WO | WO-2010/100449 | 9/2010 |
| WO | WO-2010/100451 | 9/2010 |
| WO | WO-2010/100452 | 9/2010 |
| WO | WO-2010/100453 | 9/2010 |
| WO | WO-2010/100455 | 9/2010 |
| WO | WO-2010/100462 | 9/2010 |
| WO | WO-2011/050041 | 4/2011 |
| WO | WO-2011/143924 | 11/2011 |
| WO | WO-2012/006882 | 1/2012 |
| WO | WO-2012/033517 | 3/2012 |
| WO | WO-2012/052737 | 4/2012 |
| WO | WO 2012045255 A1 * | 4/2012 |
| WO | WO-2013/014419 | 1/2013 |

OTHER PUBLICATIONS

Reba, I. (1966). "Applications of the Coanda Effect," *Scientific American* 214:84-92.
Third Party Submission Under 37 CFR 1.99 filed Jun. 2, 2011, directed to U.S. Appl. No. 12/203,698; 3 pages.
Gammack et al., U.S. Office Action mailed Dec. 9, 2010, directed to U.S. Appl. No. 12/203,698; 10 pages.
Gammack et al., U.S. Office Action mailed Jun. 21, 2011, directed to U.S. Appl. No. 12/203,698; 11 pages.
Gammack et al., U.S. Office Action mailed Sep. 17, 2012, directed to U.S. Appl. No. 13/114,707; 12 pages.
Gammack et al., U.S. Office Action mailed Dec. 10, 2010, directed to U.S. Appl. No. 12/230,613; 12 pages.
Gammack et al., U.S. Office Action mailed May 13, 2011, directed to U.S. Appl. No. 12/230,613; 13 pages.
Gammack et al., U.S. Office Action mailed Sep. 7, 2011, directed to U.S. Appl. No. 12/230,613; 15 pages.
Gammack et al., U.S. Office Action mailed Jun. 8, 2012, directed to U.S. Appl. No. 12/230,613; 15 pages.
Gammack et al., U.S. Office Action mailed Aug. 20, 2012, directed to U.S. Appl. No. 12/945,558; 15 pages.
Gammack et al., U.S. Office Action mailed Feb. 28, 2013, directed to U.S. Appl. No. 12/945,558; 16 pages.
Gammack et al., U.S. Office Action mailed Jun. 12, 2013, directed to U.S. Appl. No. 12/945,558; 20 pages.
Fitton et al., U.S. Office Action mailed Nov. 30, 2010 directed to U.S. Appl. No. 12/560,232; 9 pages.
Nicolas et al., U.S. Office Action mailed Mar. 7, 2011, directed to U.S. Appl. No. 12/622,844; 10 pages.
Nicolas et al., U.S. Office Action mailed Sep. 8, 2011, directed to U.S. Appl. No. 12/622,844; 11 pages.
Helps et al., U.S. Office Action mailed Feb. 15, 2013, directed to U.S. Appl. No. 12/716,694; 12 pages.
Gammack et al., U.S. Office Action mailed Dec. 9, 2010, directed to U.S. Appl. No. 12/716,781; 17 pages.
Gammack et al., U.S. Office Action mailed Jun. 24, 2011, directed to U.S. Appl. No. 12/716,781; 19 pages.
Gammack et al., U.S. Office Action mailed May 29, 2013, directed to U.S. Appl. No. 13/588,666; 11 pages.
Gammack et al., U.S. Office Action mailed Sep. 27, 2013, directed to U.S. Appl. No. 13/588,666; 10 pages.
Gammack et al., U.S. Office Action mailed Mar. 14, 2013, directed to U.S. Appl. No. 12/716,740; 15 pages.
Gammack et al., U.S. Office Action mailed Sep. 6, 2013, directed to U.S. Appl. No. 12/716,740; 15 pages.
Gammack et al., U.S. Office Action mailed Apr. 24, 2014, directed to U.S. Appl. No. 12/716,740; 16 pages.
Li, U.S. Office Action mailed Oct. 25, 2013, directed to U.S. Appl. No. 13/686,480; 17 pages.
Fitton et al., U.S. Office Action mailed Jun. 13, 2014, directed to U.S. Appl. No. 13/274,998; 11 pages.

(56) References Cited

OTHER PUBLICATIONS

Fitton et al., U.S. Office Action mailed Jun. 13, 2014, directed to U.S. Appl. No. 13/275,034; 10 pages.
Gammack et al., U.S. Office Action mailed Feb. 14, 2013, directed to U.S. Appl. No. 12/716,515; 21 pages.
Gammack et al., U.S. Office Action mailed Aug. 19, 2013, directed to U.S. Appl. No. 12/716,515; 20 pages.
Gammack et al., U.S. Office Action mailed Feb. 10, 2014, directed to U.S. Appl. No. 12/716,515; 21 pages.
Fitton et al., U.S. Office Action mailed Mar. 30, 2012, directed to U.S. Appl. No. 12/716,707; 7 pages.
Fitton et al., U.S. Office Action mailed Dec. 31, 2013, directed to U.S. Appl. No. 13/718,693; 8 pages.
Staniforth et al., U.S. Office Action mailed Sep. 18, 2014, directed to U.S. Appl. No. 13/559,142; 18 pages.
Gammack et al., U.S. Office Action mailed Oct. 18, 2012, directed to U.S. Appl. No. 12/917,247; 11 pages.
Gammack et al., U.S. Office Action mailed Sep. 3, 2014, directed to U.S. Appl. No. 13/861,891; 7 pages.
Wallace et al., U.S. Office Action mailed Jun. 7, 2013, directed to U.S. Appl. No. 13/192,223; 30 pages.
Wallace et al., U.S. Office Action mailed Oct. 23, 2013, directed to U.S. Appl. No. 13/192,223; 18 pages.
Gammack et al., U.S. Office Action mailed Apr. 12, 2011, directed to U.S. Appl. No. 12/716,749; 8 pages.
Gammack et al., U.S. Office Action mailed Sep. 1, 2011, directed to U.S. Appl. No. 12/716,749; 9 pages.
Gammack et al., U.S. Office Action mailed Jun. 25, 2012, directed to U.S. Appl. No. 12/716,749; 11 pages.
Gammack et al., U.S. Office Action mailed May 24, 2011, directed to U.S. Appl. No. 12/716,613; 9 pages.
Fitton et al., U.S. Office Action mailed Mar. 8, 2011, directed to U.S. Appl. No. 12/716,780; 12 pages.
Fitton et al., U.S. Office Action mailed Sep. 6, 2011, directed to U.S. Appl. No. 12/716,780; 16 pages.
Nock et al., U.S. Office Action mailed Mar. 13, 2015, directed to U.S. Appl. No. 13/760,642; 16 pages.
Search Report dated May 30, 2012, directed towards GB Application No. 1202004.6; 2 pages.

* cited by examiner

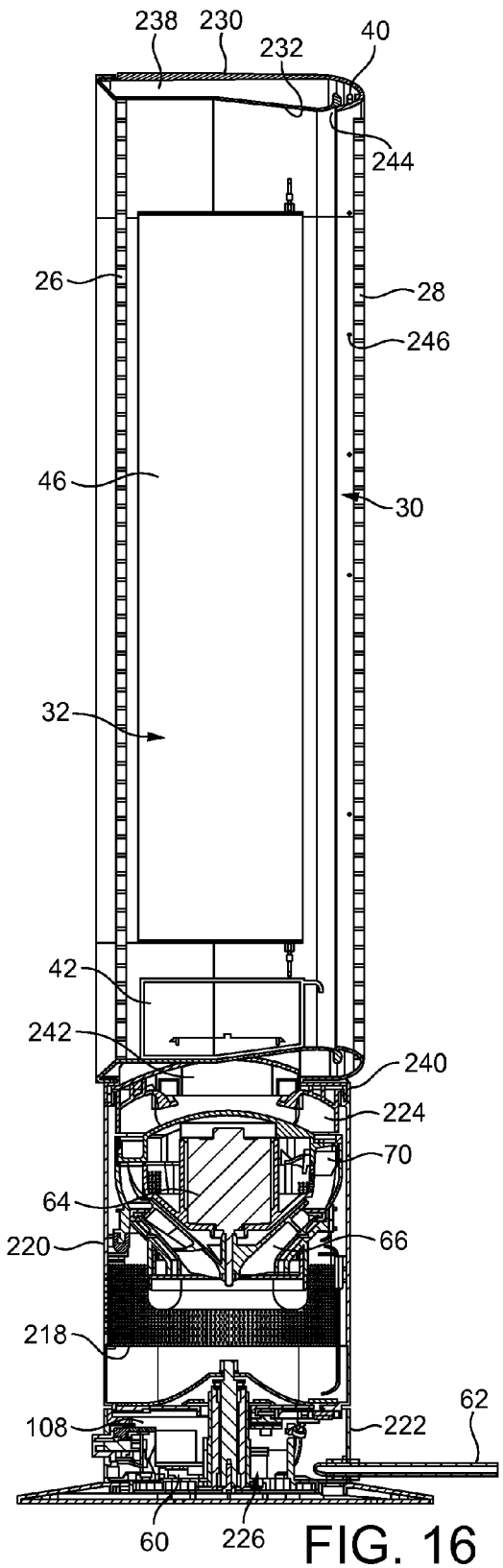

FAN

REFERENCE TO RELATED APPLICATIONS

This application claims the priority of United Kingdom Application No. 1202004.6, filed Feb. 6, 2012, the entire contents of which are incorporated herein by reference.

FIELD OF THE INVENTION

The present invention relates to a fan.

BACKGROUND OF THE INVENTION

A conventional domestic fan typically includes a set of blades or vanes mounted for rotation about an axis, and drive apparatus for rotating the set of blades to generate an air flow. The movement and circulation of the air flow creates a 'wind chill' or breeze and, as a result, the user experiences a cooling effect as heat is dissipated through convection and evaporation. The blades are generally located within a cage which allows an air flow to pass through the housing while preventing users from coming into contact with the rotating blades during use of the fan.

U.S. Pat. No. 2,488,467 describes a fan which does not use caged blades to project air from the fan assembly. Instead, the fan assembly comprises a base which houses a motor-driven impeller for drawing an air flow into the base, and a series of concentric, annular nozzles connected to the base and each comprising an annular outlet located at the front of the nozzle for emitting the air flow from the fan. Each nozzle extends about a bore axis to define a bore about which the nozzle extends.

Each nozzle is in the shape of an airfoil. An airfoil may be considered to have a leading edge located at the rear of the nozzle, a trailing edge located at the front of the nozzle, and a chord line extending between the leading and trailing edges. In U.S. Pat. No. 2,488,467 the chord line of each nozzle is parallel to the bore axis of the nozzles. The air outlet is located on the chord line, and is arranged to emit the air flow in a direction extending away from the nozzle and along the chord line.

Another fan assembly which does not use caged blades to project air from the fan assembly is described in WO 2010/100451. This fan assembly comprises a cylindrical base which also houses a motor-driven impeller for drawing a primary air flow into the base, and a single annular nozzle connected to the base and comprising an annular mouth through which the primary air flow is emitted from the fan. The nozzle defines an opening through which air in the local environment of the fan assembly is drawn by the primary air flow emitted from the mouth, amplifying the primary air flow. The nozzle includes a Coanda surface over which the mouth is arranged to direct the primary air flow. The Coanda surface extends symmetrically about the central axis of the opening so that the air flow generated by the fan assembly is in the form of an annular jet having a cylindrical or frusto-conical profile.

GB 2,479,760 describes a modification of the fan assembly described in WO 2010/100451. The cylindrical base of the fan assembly is increased in height to accommodate an electrostatic filter for removing particulates from the primary air flow before it enters the annular nozzle. The electrostatic filter is connected to an electrical influence machine located in the base of the fan assembly so that power generated by the electrical influence machine is supplied to the electrostatic filter.

SUMMARY OF THE INVENTION

In a first aspect, the present invention provides a fan comprising a base comprising an impeller and a motor for driving the impeller, and a nozzle connected to the base, the nozzle comprising at least one air inlet, at least one air outlet, a casing defining a passage through which air from outside the fan is drawn by air emitted from said at least one air outlet, and an electrostatic precipitator for treating the air drawn through the passage.

The passage is preferably an enclosed passage of the nozzle. The casing is preferably in the form of an annular casing, and so the passage is preferably a bore defined by the casing and through which air from outside the fan is drawn by air emitted from the air outlet(s).

In a second aspect, the present invention provides a fan comprising a base comprising an impeller and a motor for driving the impeller, and a nozzle connected to the base, the nozzle comprising at least one air inlet, at least one air outlet, an annular casing defining a bore through which air from outside the fan is drawn by air emitted from said at least one air outlet, and an electrostatic precipitator for treating the air drawn through the bore.

The air emitted from the air outlet(s) of the nozzle, hereafter referred to as a primary air flow, entrains air surrounding the nozzle, which thus acts as an air amplifier to supply both the primary air flow and the entrained air to the user. The entrained air will be referred to here as a secondary air flow. The secondary air flow is drawn from the room space, region or external environment surrounding the nozzle. Some of the secondary air flow will be drawn through the bore of the nozzle, and some of the secondary air flow will become entrained within the primary air flow downstream from the nozzle. The primary air flow combines with the entrained secondary air flow to form a combined, or total, air flow projected forward from the front of the nozzle.

The flow rate of the air drawn through the bore of the nozzle may be at least three times, preferably at least five times and in a preferred embodiment is around eight times the flow rate of the primary air flow emitted from the air outlet(s) of the nozzle. Providing an electrostatic precipitator for treating the portion of the secondary air flow which is drawn through the bore, as opposed to treating the primary air flow, can significantly increase the proportion of the overall air flow generated by the fan which is treated by the electrostatic precipitator.

The electrostatic precipitator is preferably located within the casing of the nozzle. At least part of the electrostatic precipitator is preferably located within the bore of the nozzle. In one embodiment, the electrostatic precipitator is housed fully within the bore of the nozzle, so that the casing extends about the electrostatic precipitator. In another embodiment one section of the electrostatic precipitator is housed within the bore of the nozzle and another section of the electrostatic precipitator is housed between annular casing sections of the nozzle.

The electrostatic precipitator may be a two-stage electrostatic precipitator through which air is drawn by the air emitted from the air outlet(s). The electrostatic precipitator may thus comprise a charging section for charging particulates, such as dust, pollen and smoke, within the air flow drawn through the charging section, and a collecting section downstream from the charging section for removing the charged particulates from the air flow. Each of the charging section and the collecting section may be located in the bore of the nozzle. Alternatively, the collecting section may be located in the bore of the nozzle and the charging section may be housed between annular casing sections of the nozzle.

The charging section may comprise means for generating an electric field for ionizing the air flow. In one example, the charging section utilizes an electrospray charging technique, in which an electrically conductive fluid, such as water, is supplied to a plurality of nozzles or capillaries, and a strong electric voltage is applied to the nozzles or the fluid to cause the fluid to be ionized and sprayed spontaneously from the nozzle apertures. The emitted ions disperse and interact with particulates within the air drawn through the bore to cause charge to be transferred to those particulates. The nozzles may be fully located within the bore, or they may be housed within a chamber or air flow passage extending about the bore. The outlets of the nozzles are preferably located adjacent to apertures provided in a wall defining the bore so as to spray ions through the apertures and into the bore of the nozzle. Alternatively, the nozzles may be arranged in one or more rows, columns or elongate arrangements disposed within and extending across the bore.

The collecting section preferably comprises a plurality of plates. A negative or positive voltage may be applied to alternate plates to generate an electric field between the plates. As the air flow enters the collecting section from the charging section, the charged particulates are attracted to and collect on the plates. The plates are preferably located within the bore of the nozzle, and preferably extend across the bore of the nozzle. The plates are preferably parallel.

The electrostatic precipitator may be housed within a cartridge which is removable from the bore of the nozzle. This can allow the electrostatic precipitator to be withdrawn from the bore of the nozzle as required, for example for periodic cleaning or replacement, without requiring disassembly of the fan. The charging section may be housed within a charging section chamber of the cartridge. The charging section chamber may be annular in shape to define a central passageway for conveying the air flow drawn through the bore towards the collecting section of the electrostatic precipitator. This chamber may comprise a plurality of apertures through which the nozzles spray the ionized fluid into the air flow. The base preferably comprise a first voltage source for supplying a first DC voltage to the charging section of the electrostatic precipitator, and a second voltage source for supplying a second DC voltage to the collecting section of the electrostatic precipitator. The outer surface of the cartridge may be provided with electrical contacts for engaging contacts provided on the casing of the nozzle to connect the voltage sources to the electrostatic precipitator.

A mesh grille may be provided at the rear end of the bore for inhibiting the ingress of larger particles or other objects into the electrostatic precipitator.

The air outlet(s) may be arranged to emit air away from the electrostatic precipitator. For example, the air outlet(s) may be located downstream from the electrostatic precipitator, and may be arranged to emit air in a direction which is substantially parallel to the plates of the electrostatic precipitator. The nozzle may have a front end towards which air is emitted from the air outlet(s), and a rear end opposite to the front end, with the air outlet(s) being located between the front end and the rear end. The air flow drawn through the bore passes from the rear end to the front end of the nozzle. The electrostatic precipitator may be located between the air outlet(s) and the rear end of the nozzle.

Alternatively, the air outlet(s) may be arranged to emit air along at least one side of at least part of the electrostatic precipitator. For example, the nozzle may comprise an annular air outlet which is arranged to emit air around at least part of the electrostatic precipitator. As another example, the nozzle may comprise two air outlets each arranged to emit air along at least part of a respective side of the electrostatic precipitator.

The air outlet(s) may be arranged to emit air in a direction which is substantially parallel to the plates of the electrostatic precipitator to maximise the flow rate of the air drawn through the bore of the nozzle. Alternatively, the air outlet(s) may be arranged to emit air in a direction which is substantially orthogonal to the plates of the electrostatic precipitator.

The air outlet(s) preferably extend across the bore. Each air outlet is preferably in the form of a slot, and where the fan comprises a plurality of air outlets, the air outlets are preferably substantially parallel.

The nozzle preferably comprises at least one air passage for conveying air from the air inlet(s) towards the air outlet(s). The annular casing may comprise an annular inner wall and an outer wall extending about the inner wall, and an air passage may be conveniently located between the inner wall and the outer wall of the casing. Each wall of the casing may comprise a single annular component. Alternatively, one or both of the walls of the nozzle may be formed from a plurality of connected annular sections. A section of the inner wall may be integral with at least part of the outer wall. The air passage preferably extends at least partially about the electrostatic precipitator. For example, the air passage may be an annular passage which surrounds the bore of the nozzle, and thus may surround the electrostatic precipitator. Alternatively, the air passage may comprise a plurality of sections which each extend along a respective side of the bore of the nozzle, and thus along a respective side of the electrostatic precipitator, to convey air away from a respective air inlet.

The air passage may comprise means for treating air drawn into the fan through the air inlet(s). This can enable particulates to be removed from the primary air flow before it is emitted from the air outlet(s). The air treating means may comprise at least one air filter. The air filter may be in the form of a HEPA filter, or other filter medium such as a foam, carbon, paper, or fabric filter. Alternatively, the air filter may comprise a pair of plates between which an electric field is generated to cause particulates within the primary air flow to be attracted to one of the plates.

The air inlet(s) of the nozzle may provide one or more air inlets of the fan. For example, the air inlet(s) may comprise a plurality of apertures formed on the outer wall of the nozzle through which air enters the fan. In this case, the motor-driven impeller located in the base generates a primary air flow which passes from the air inlet(s) in the nozzle to the base, and then passes from the base to the air outlet(s) in the nozzle. The nozzle may thus comprise an air outlet port for conveying air to the base, and an air inlet port for receiving air from the base. In this case, the at least one air passage preferably comprises a first air passage for conveying air from the air inlet(s) to the air outlet port, and a second air passage for conveying air from the air inlet port to the air outlet(s). As mentioned above, the first air passage may be an annular passage which surrounds the bore of the nozzle. Alternatively, the first air passage may comprise a plurality of sections which each extend along a respective side of the bore of the nozzle to convey air from a respective air inlet towards the air outlet port of the nozzle. The first air passage is preferably located between the inner wall and the outer wall of the casing. The first air passage may comprise means for treating air drawn into the fan through the air inlet(s).

The nozzle may comprise a plurality of air outlets each for emitting a respective portion of the air flow received from the air inlet port. Alternatively, the nozzle may comprise a single air outlet. The air outlet(s) may be formed in the inner wall or the outer wall of the nozzle. As another alternative, the air outlet(s) may be located between the inner wall and the outer wall of the casing. In any of these cases, the second air passage may be located between the inner wall and the outer wall, and may be isolated from the first air passage by one or more partitioning walls located between the inner wall and the outer wall of the casing. Similar to the first air passage, the second air passage may comprise an annular passage which surrounds the bore of the nozzle. Alternatively, the second air passage may comprise a plurality of sections which each extend along a respective side of the bore of the nozzle to convey air from the air inlet port to a respective air outlet.

As a further alternative, the air outlet(s) may be located in the bore of the nozzle. In other words, the air outlet(s) may be surrounded by the inner wall of the nozzle. The air outlet(s) may thus be located within a front section of the bore, with the electrostatic precipitator being located within a rear section of the bore so that the air outlet(s) emit air away from the electrostatic precipitator. Alternatively, each of the air outlet(s) and the electrostatic precipitator may be located in a common section, for example the rear section of the bore. In either case, the electrostatic precipitator may be located upstream from the air outlet(s) with respect to the air passing through the bore. As another example, the plates of the electrostatic precipitator may be located around, or to one side of the air outlet(s).

At least an outlet section of the second air passage may thus extend at least partially across the bore of the nozzle to convey air to the air outlet(s). For example, an outlet section of the second air passage may extend between a lower end of the bore and an upper end of the bore. The outlet section of the second air passage may extend in a direction orthogonal to a central axis of the bore. In a preferred embodiment, the second air passage comprises a plurality of columnar or elongate outlet sections which each extend across the bore of the nozzle to convey air to a respective air outlet. The outlet sections of the second air passage are preferably parallel. Each outlet section of the second air passage may be defined by a respective tubular wall extending across the bore.

To achieve a relatively even air flow along the length of each elongate section of the second air passage, each end of the outlet sections preferably comprises a respective air inlet. The second air passage preferably comprises an annular inlet section which extends about the bore and is arranged to convey air into each end of each outlet section of the second air passage. This can achieve an even air pressure at each end of the outlet sections of the second air passage.

Each air outlet is preferably in the form of a slot extending along a respective outlet section of the second air passage. Each air outlet is preferably located at the front of its respective outlet section of the second air passage to emit air towards the front end of the nozzle.

The air flows emitted from the air outlets preferably do not merge within the bore of the nozzle. For example, these air flows may be isolated from each other within the bore of the nozzle. The bore of the nozzle may comprise a dividing wall for dividing the bore into two sections, with each section comprising a respective air outlet. This dividing wall may extend in a direction which is substantially parallel to the axis of the bore, and may be substantially parallel to the plates of the collecting section of the electrostatic precipitator. In a plane containing the axis of the bore and located midway between upper and lower ends of the bore, each air outlet may be located midway between the dividing wall and the inner wall of the nozzle. Each air outlet may extend substantially parallel to the dividing wall.

We have found that the air drawn through the bore of the nozzle may be caused to flow through the electrostatic precipitator at a relatively even flow rate through locating the air outlets between the front end and the rear end of the nozzle. The preferred distance between the air outlets and the front end of the nozzle is a function of the number of air outlets; while increasing the number of air outlets can allow the depth of the nozzle to be reduced, this also increases the complexity of the nozzle and so in a preferred embodiment the fan comprises two air outlets each located within the bore and between the front end and the rear end of the nozzle. In this case, the dividing wall may be arranged to divide the bore into two equal half sections. Within each section of the bore and in a plane containing the axis of the bore and located midway between upper and lower ends of the bore, an angle subtended between a first line, extending from the air outlet towards the front end of the bore and parallel to the bore axis, and a second line, extending from the air outlet to the front end of the dividing wall, may be in the range from 5 to 25°, preferably in the range from 10 to 20°, and more preferably in the range from 10 to 15°. The angle is selected to maximise the rate at which air is drawn through the bore.

The collecting section of the electrostatic precipitator may be omitted so that the fan comprises an air ionizer for treating the air drawn through the bore. Therefore, in a third aspect the present invention provides a fan comprising a base comprising an impeller and a motor for driving the impeller, and a nozzle connected to the base, the nozzle comprising at least one air inlet, at least one air outlet, a casing defining a passage through which air from outside the fan is drawn by air emitted from said at least one air outlet, and an ionizer for treating the air drawn through the passage. As discussed above, the passage is preferably an enclosed passage of the nozzle. The casing is preferably in the form of an annular casing, and so the passage is preferably a bore defined by the casing and through which air from outside the fan is drawn by air emitted from the air outlet(s).

In a fourth aspect the present invention provides a nozzle for a fan assembly, the nozzle comprising an air inlet, a plurality of air outlets, and an annular casing comprising an annular inner wall defining a bore through which air from outside the nozzle is drawn by air emitted from the air outlets and an outer wall extending about the inner wall, the annular casing comprising an air passage for conveying air to the air outlets, the air passage comprising an inlet section located between the inner wall and the outer wall and extending about the bore of the nozzle, and a plurality of outlet sections each extending across the bore for conveying air to a respective air outlet, the inlet section of the air passage being connected to each end of each of the outlet sections.

In a fifth aspect the present invention provides a nozzle for a fan assembly, the nozzle comprising at least one air inlet, a plurality of air outlets, and an annular casing comprising an air passage for conveying air to the air outlets, the casing defining a bore through which air from outside the nozzle is drawn by air emitted from the air outlets, the bore having a front end and a rear end opposite to the front end, wherein the casing comprises a dividing wall for dividing the bore into two sections, each section of the bore comprising a respective outlet section of the air passage and a respective air outlet, the air outlets being located between the front end and the rear end of the bore.

As an alternative to forming one or more air inlets of the fan in the nozzle, the base of the fan may comprise one or more air inlets through which the primary air flow enters the fan. In this case, an air passage may extend within the nozzle from an air inlet of the nozzle to an air outlet of the nozzle. The air passage may extend about the bore. For example, the air passage may surround the bore of the nozzle. The nozzle may comprise a single air outlet extending at least partially about, and preferably surrounding, the bore of the nozzle. Alternatively, the nozzle may comprise a plurality of air outlets each located on a respective side of the nozzle so as to each extend partially about the bore of the nozzle. The air outlet may comprise at least one slot located between the inner wall and the outer wall of the nozzle. Each slot may be located between the front end and the rear end of the nozzle, or located at the front end of the nozzle.

Features described above in connection with the first or second aspects of the invention are equally applicable to each of the other aspects of the invention, and vice versa.

BRIEF DESCRIPTION OF THE DRAWINGS

An embodiment of the present invention will now be described, by way of example only, with reference to the accompanying drawings, in which:

FIG. 15 is a top view of the fan of FIG. 11; and

FIG. 16 is a side sectional view taken along line C-C in FIG. 15.

DETAILED DESCRIPTION OF THE INVENTION

Figure 1:
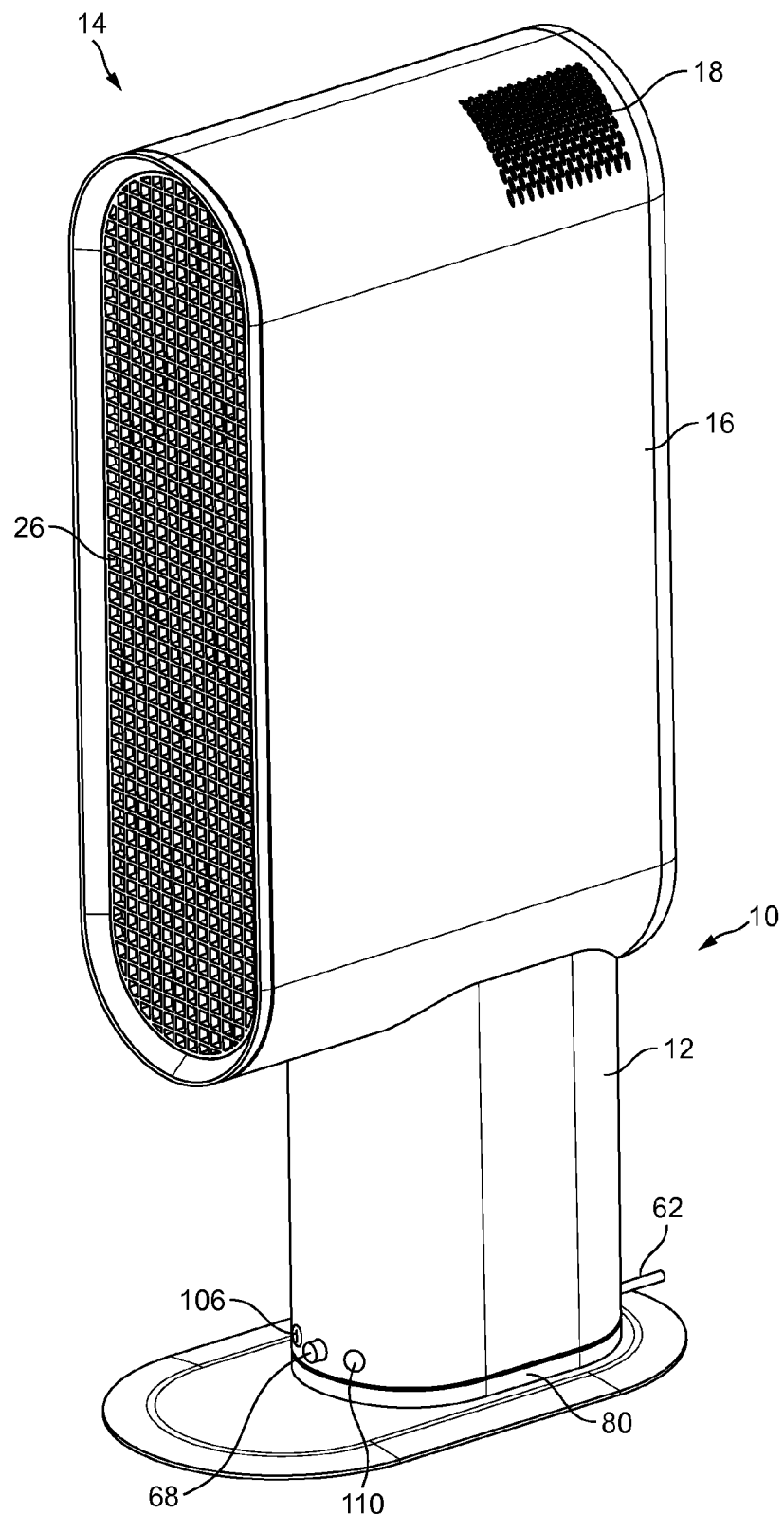
FIG. 1 is a front perspective view, from above, of a first embodiment of a fan.
Figure 2:
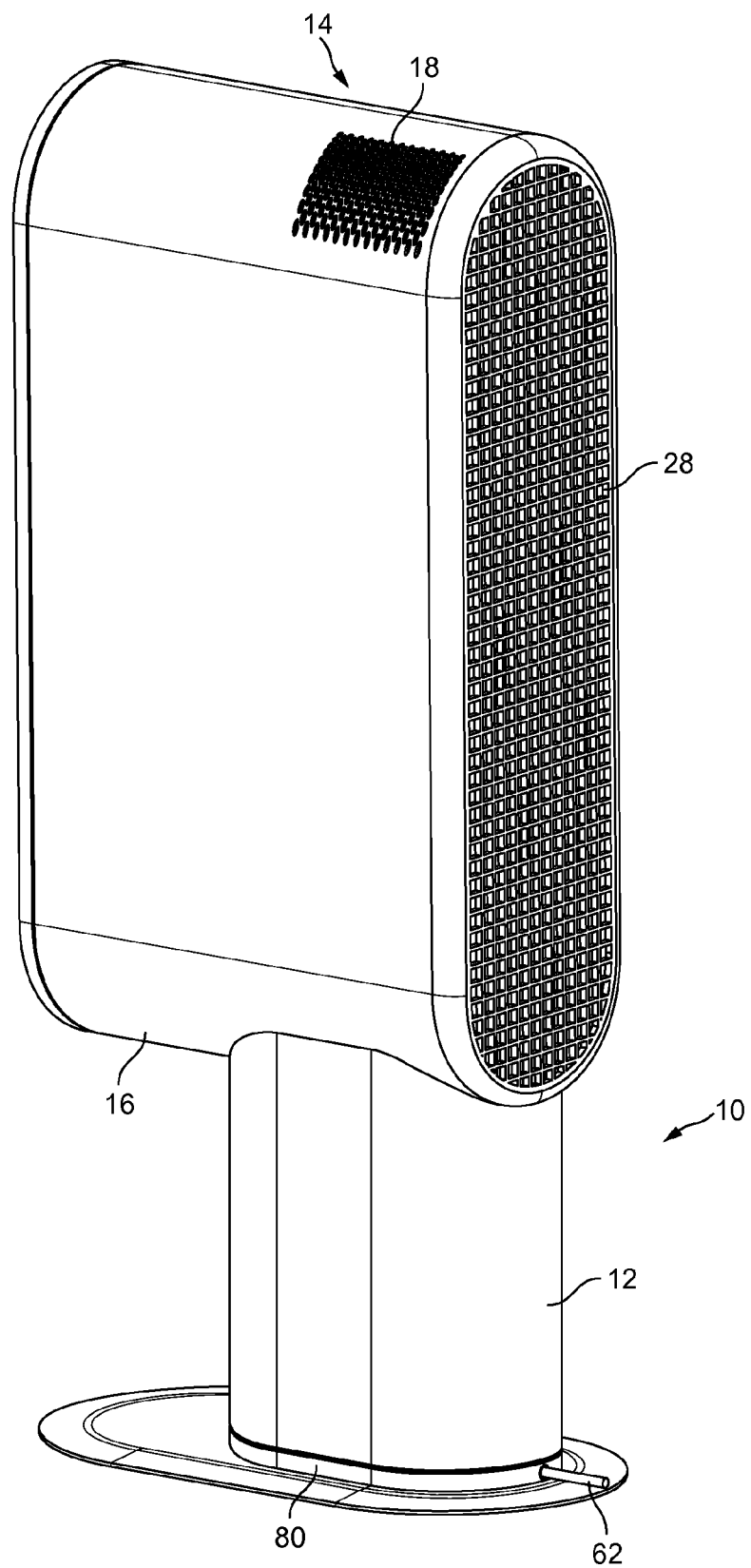
FIG. 2 is a rear perspective view, from above, of the fan.
Figure 3:
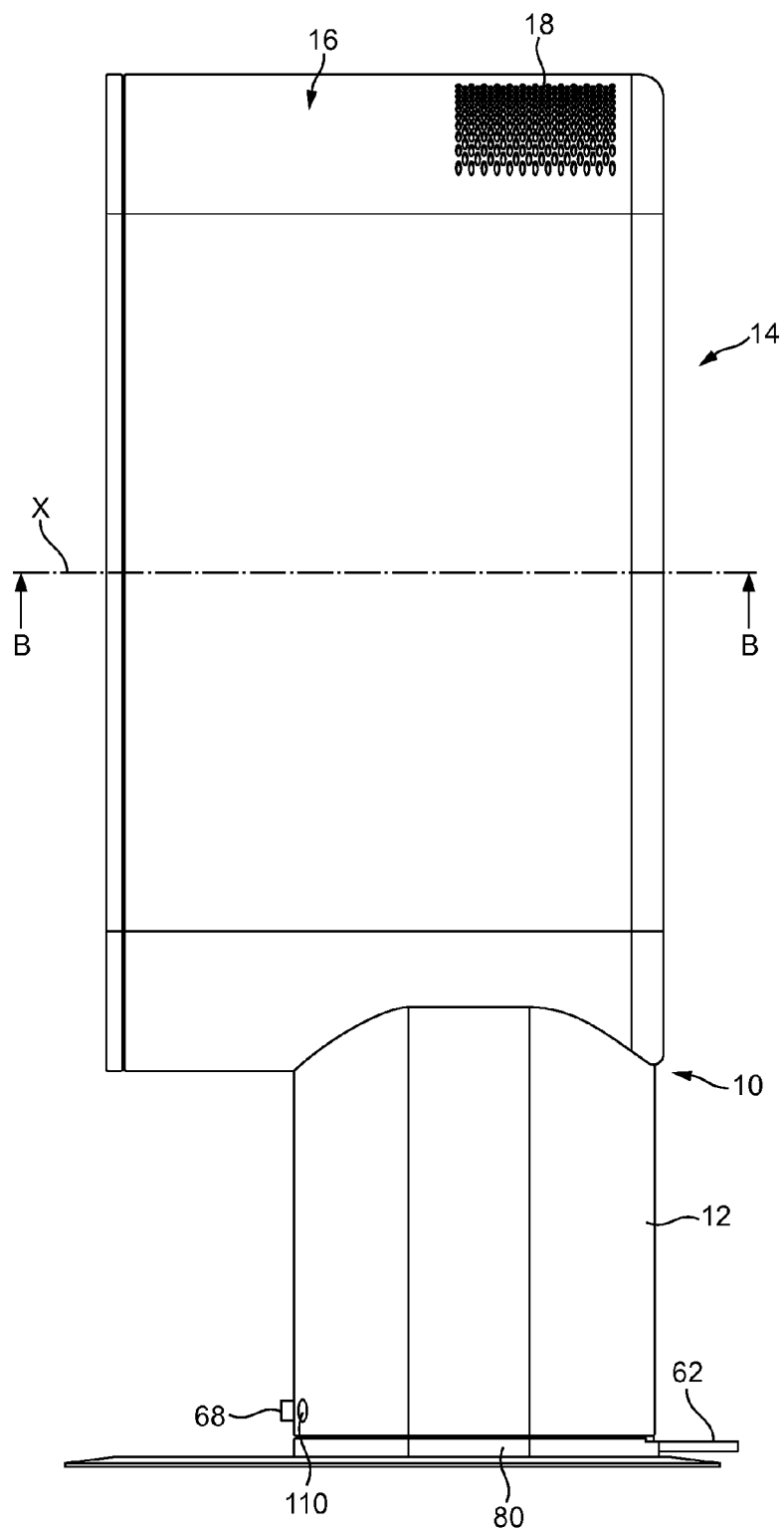
FIG. 3 is a left side view of the fan.
Figure 4:
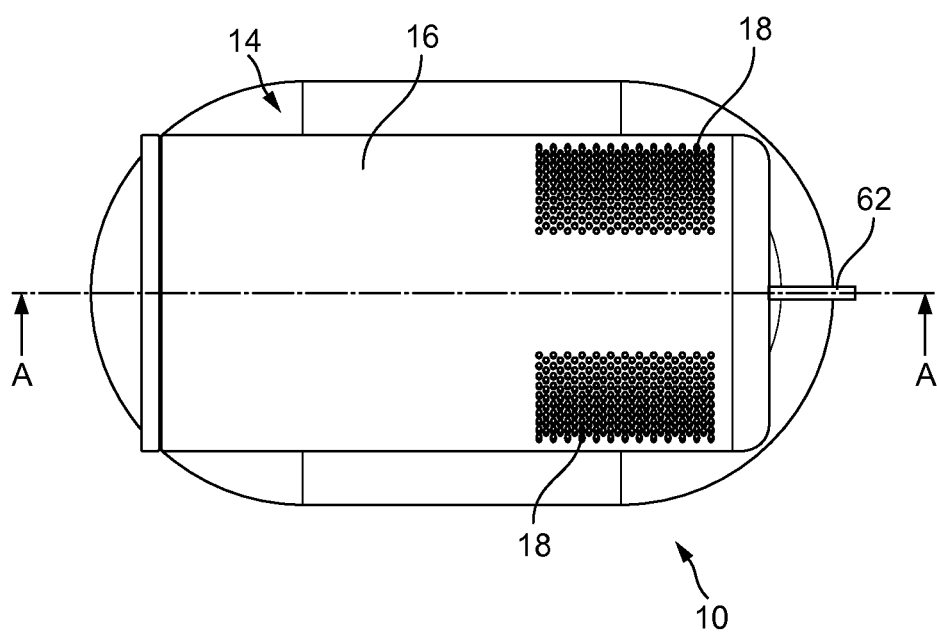
FIG. 4 is a top view of the fan.

FIGS. 1 to 4 are external views of a first embodiment of a fan 10. The fan 10 comprises a main body including a base 12 and a nozzle 14 mounted on the base 12. The nozzle 14 is in the form of a loop comprising an annular casing 16 having a plurality of air inlets 18 through which a primary air flow is drawn into the fan 10. As illustrated, each air inlet 18 may comprise a plurality of apertures formed in the casing 16. Alternatively, each air inlet 18 may comprise a mesh or grille attached to the casing 16. As discussed in more detail below, the nozzle 14 comprises at least one air outlet for emitting the primary air flow from the fan 10.

Figure 5:
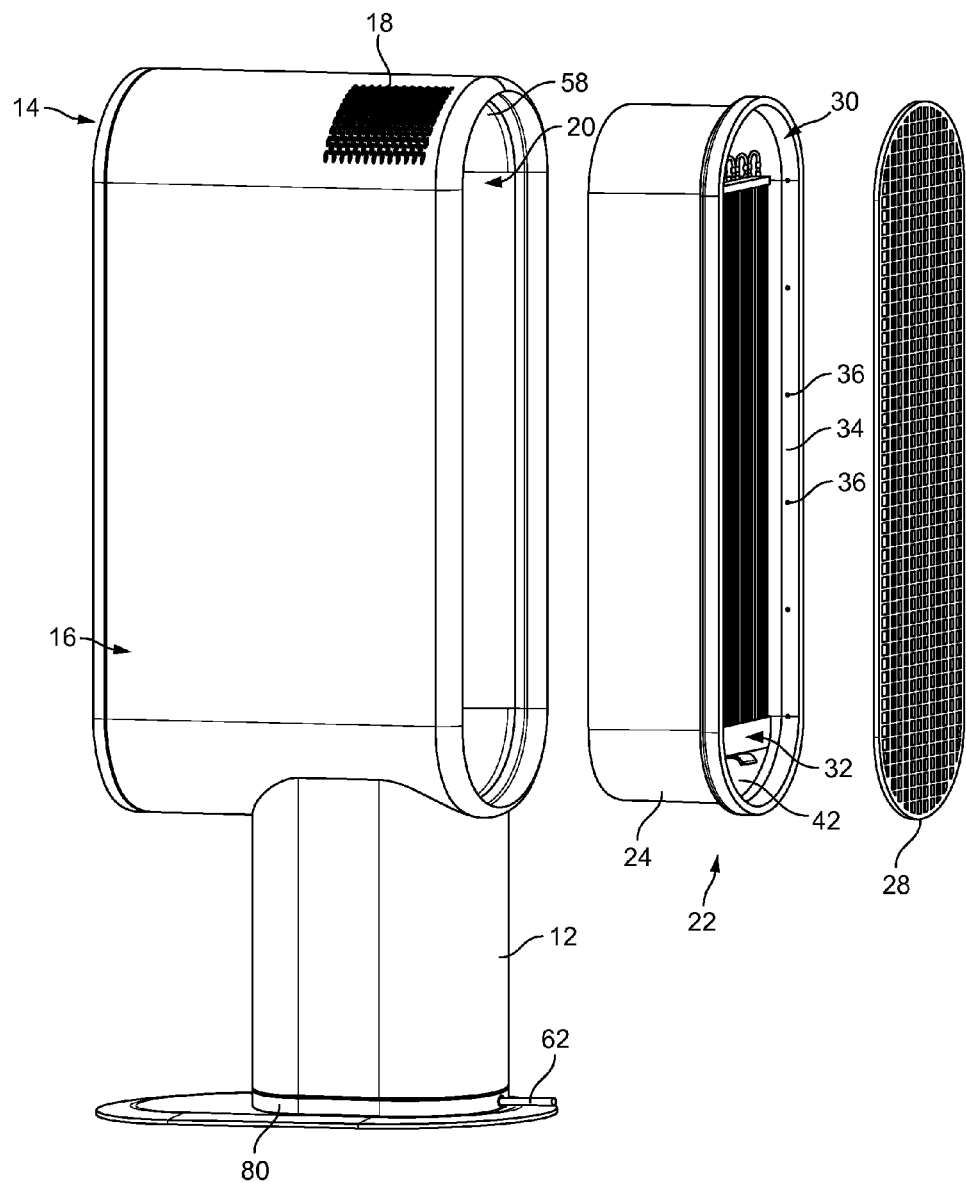
FIG. 5 is an exploded view of the main body, electrostatic precipitator and rear grille of the fan.

With reference also to FIG. 5, the casing 16 extends about and defines a bore 20 of the nozzle 14. In this example, the bore 20 has a generally elongate shape, having a height (as measured in a direction extending from the upper end of the nozzle to the lower end of the nozzle 14) which is greater than its width (as measured in a direction extending between the side walls of the nozzle 14). The emission of the primary air flow from the fan 10 draws air from outside the fan 10 through the bore 20 of the nozzle 14.

The nozzle 14 houses an electrostatic precipitator 22 for treating the air drawn through the bore 20 of the nozzle 14. The electrostatic precipitator 22 is housed within an annular cartridge 24 which is insertable into, and preferably removable from, a rear section of the bore 20 of the nozzle 14. A pair of grilles 26, 28 may be provided at the front end and the rear end respectively of the nozzle 14 to inhibit the ingress of relatively large particles or other objects into the electrostatic precipitator 22.

Figure 6:
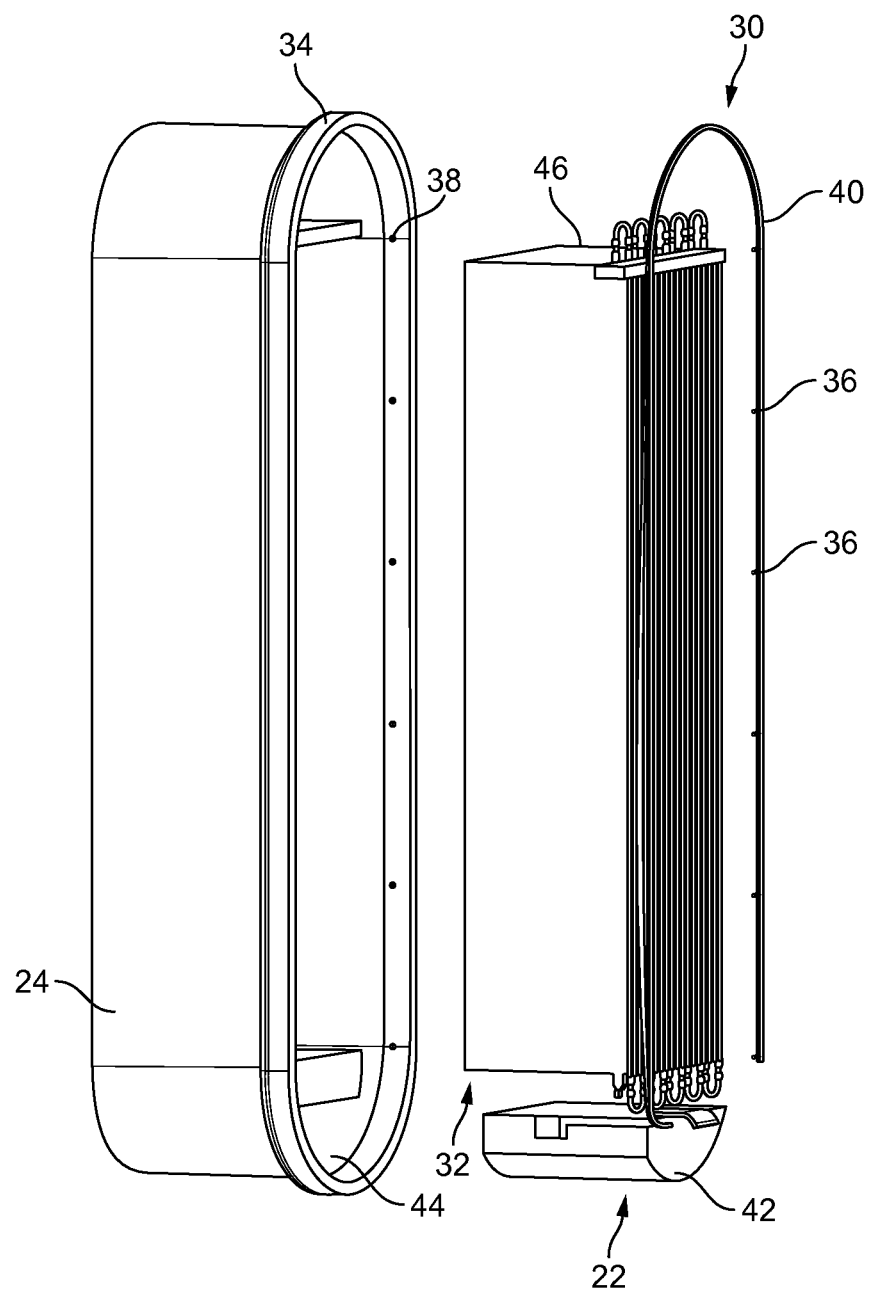
FIG. 6 is an exploded view of the electrostatic precipitator.
Figure 7:
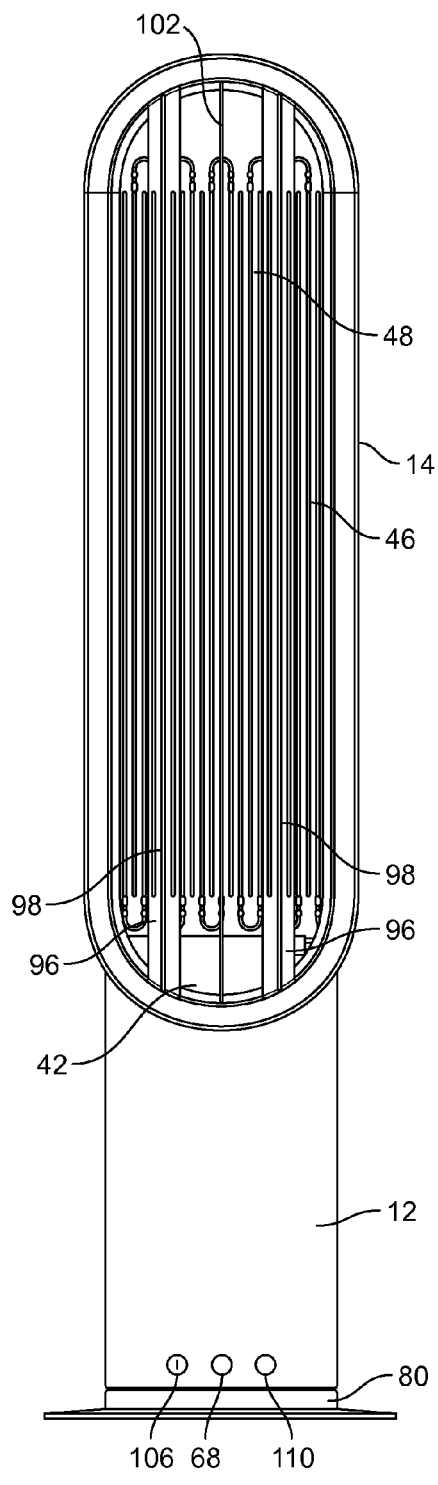
FIG. 7 is a front view of the fan with the front grille removed.
Figure 8:
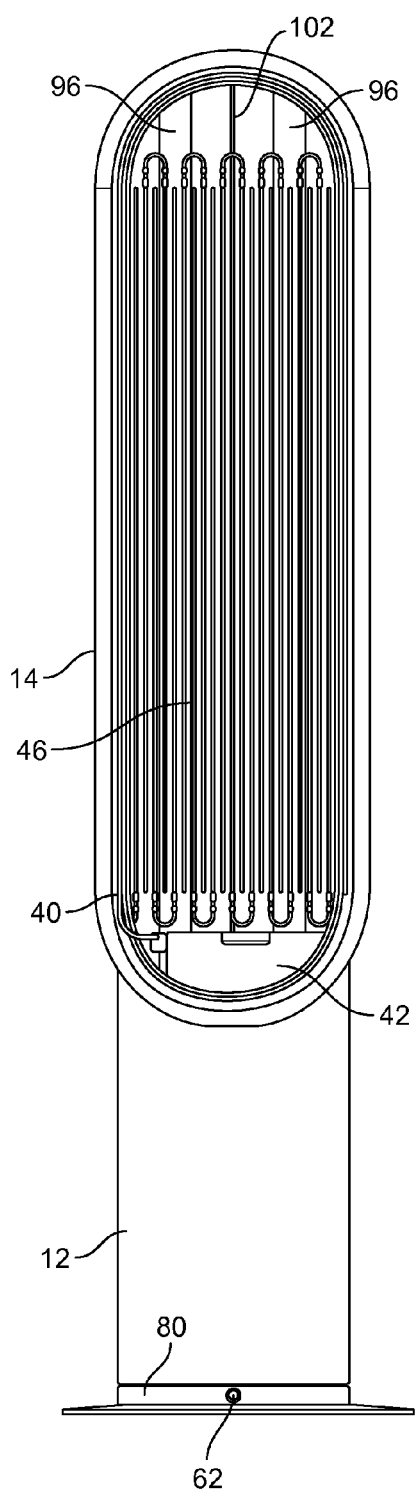
FIG. 8 is a rear view of the fan with the rear grille removed.

With reference also to FIGS. 6 to 8, in this example the electrostatic precipitator 22 is in the form of a two-stage electrostatic precipitator, comprising a charging section 30 for charging particulates, such as dust, pollen and smoke, within the air flow drawn through the bore 20 of the nozzle 14, and a collecting section 32 downstream from the charging section 30 for removing the charged particulates from the air flow. The charging section 30 is housed within an annular charging section chamber 34 located at the rear end of the cartridge 24. The charging section 30 comprises a plurality of nozzles 36 which are each located adjacent to a respective aperture 38 formed in the charging section chamber 34. Each nozzle 36 has an aperture having a diameter in the range from 0.05 to 0.5 mm. Each of the nozzles 36 is connected to a conduit 40 which conveys a fluid, such as water or air, to the nozzles 36 from a fluid reservoir 42 housed within a lower chamber section 44 of the cartridge 24. A pump is provided to convey the fluid from the reservoir 42 to the nozzles 36. A needle-like electrode (not shown) is inserted into each of the nozzles 36 for imparting a strong electric charge to cause the fluid within the nozzles 36 to be ionized and sprayed spontaneously from the nozzle apertures and through the apertures 38. Alternatively, the fluid could be charged directly, for example by providing a charging electrode within the reservoir 42. One or more wires (not shown) provide one or more ground electrodes for the charging section 30. The base 12 houses a first voltage source (not shown) for supplying a first DC voltage to the needle-like electrodes. The first DC voltage may be in the range from 5 to 15 kV. In one example where the fluid supplied to the nozzles 36 is water, the first DC voltage is around 8 kV. Alternatively, the first voltage source may be configured to supply an AC voltage to the electrodes.

Figure 10:
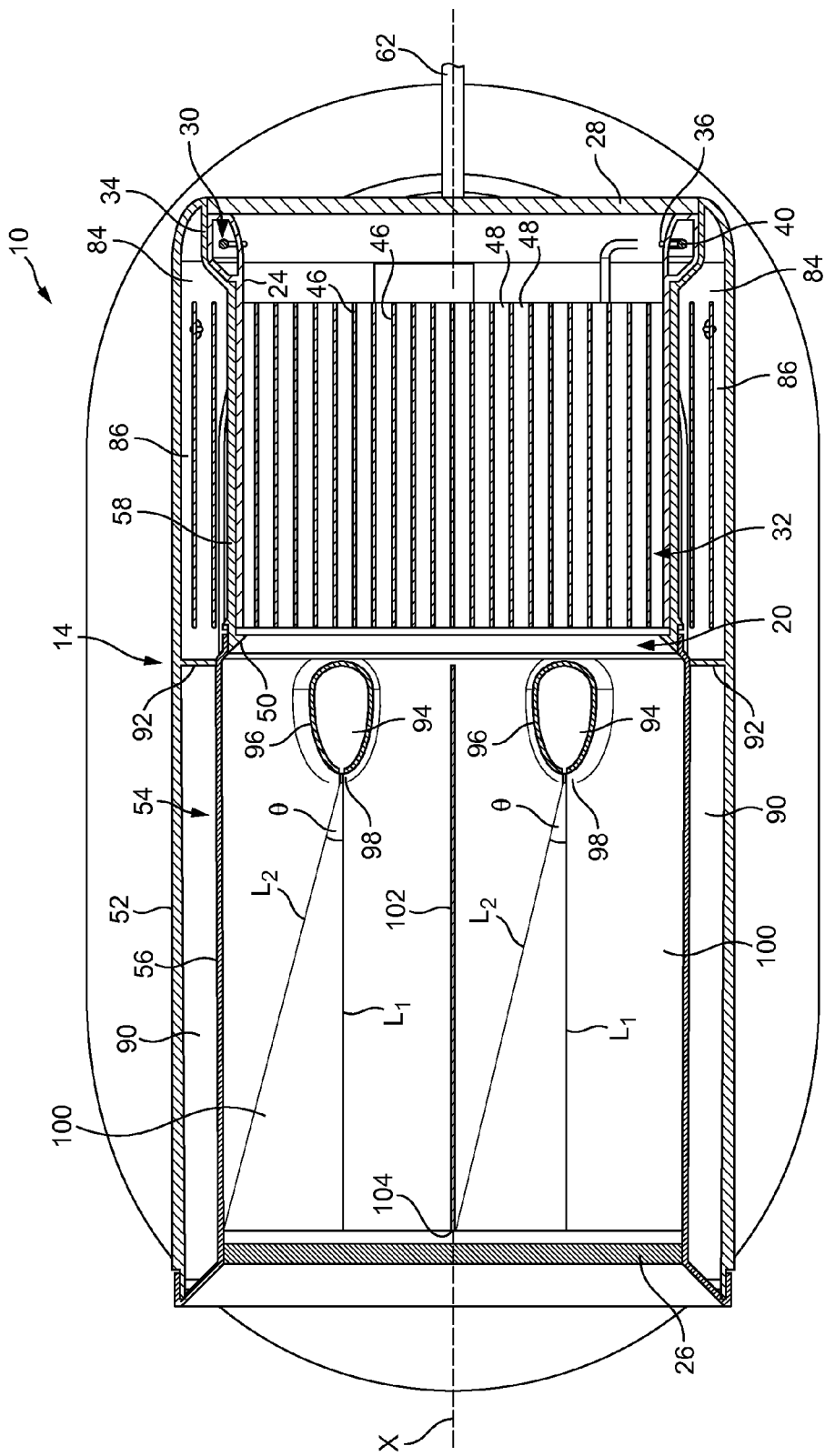
FIG. 10 is a top sectional view taken along line B-B in FIG. 3.
Figure 11:
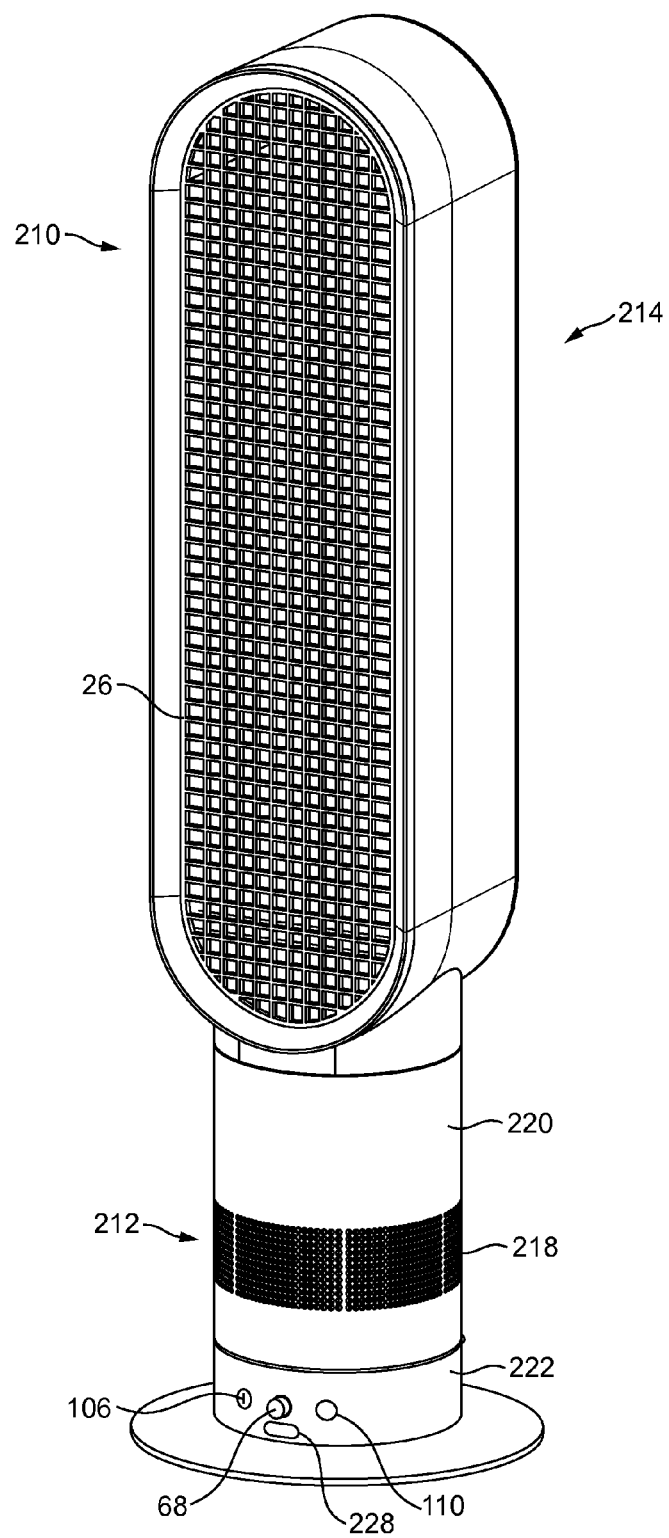
FIG. 11 is a front perspective view, from above, of a second embodiment of a fan.
Figure 12:
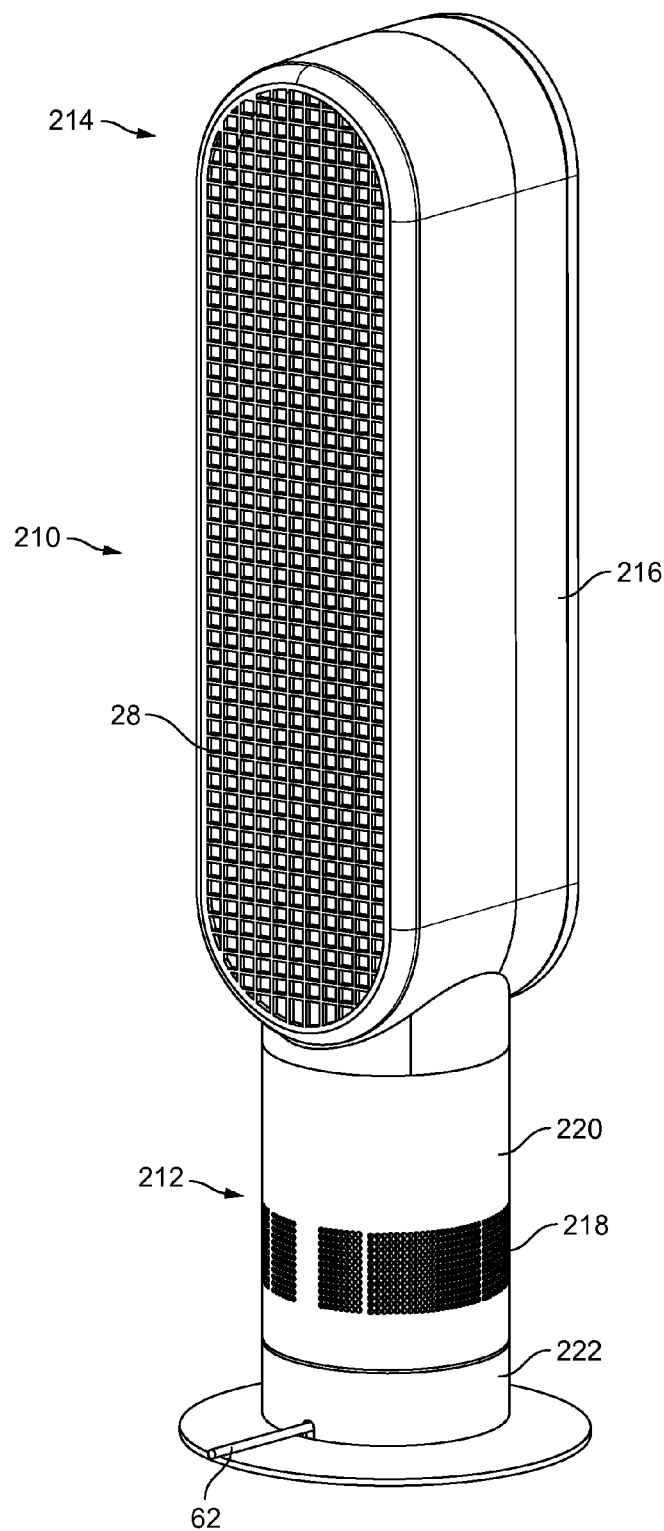
FIG. 12 is a rear perspective view, from above, of the fan of FIG. 11.
Figure 13:
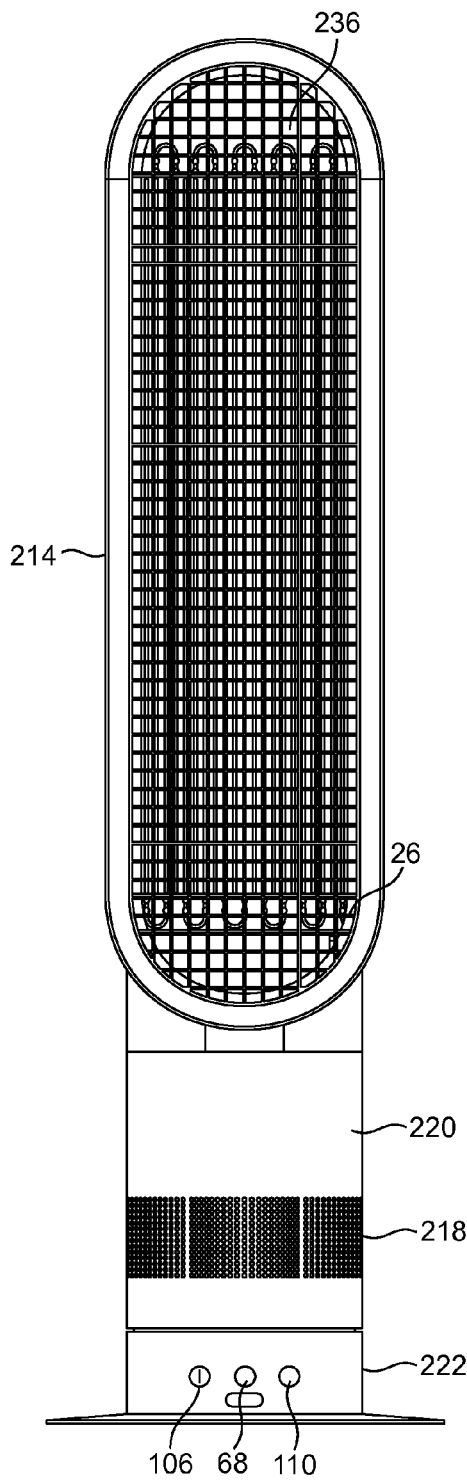
FIG. 13 is a front view of the fan of FIG. 11.
Figure 14:
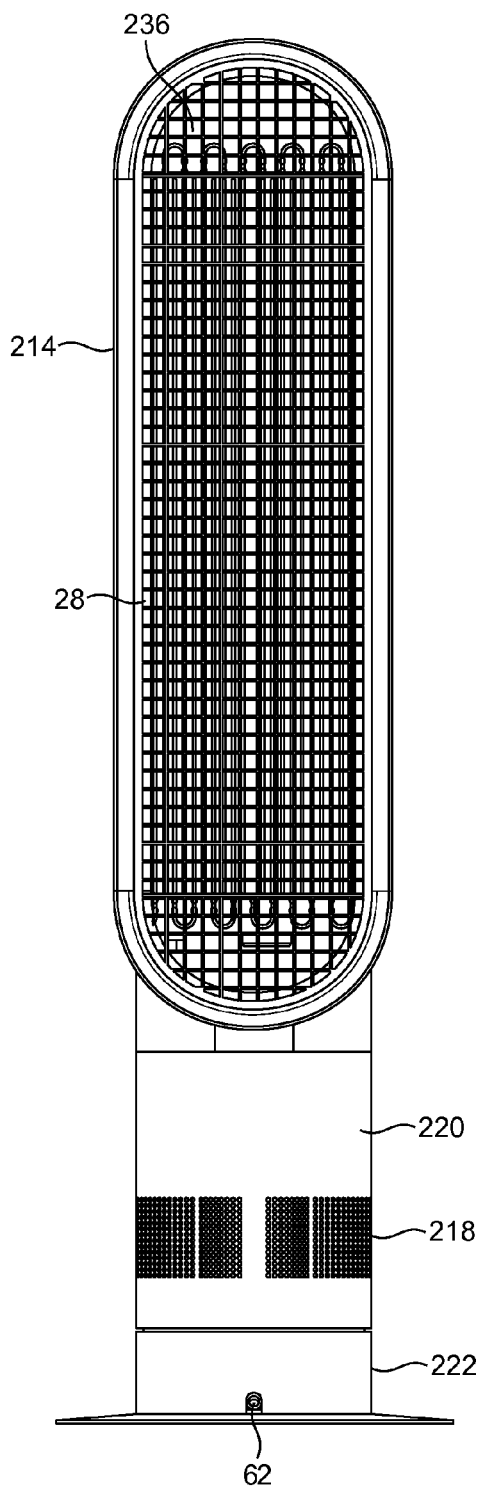
FIG. 14 is a rear view of the fan of FIG. 11.

The collecting section 32 comprises a plurality of parallel plates 46. The plates 46 may be formed from stainless steel. With reference also to FIG. 10, the plates 46 are arranged to define a series of air channels 48 between the plates 46 for conveying air through the collecting section 32. The plates 46 are aligned so that each air channel 48 extends towards the front end of the bore 20 in a direction which is substantially parallel to the central axis X of the bore 20. In this example, the spacing between the plates 46, and thus the width of the air channels 48, is 5 mm. The base 12 houses a second voltage source (not shown) for supplying a second, preferably negative DC voltage to alternate plates 46 to generate an electric field between adjacent plates 46. In this example, the second voltage source is arranged to supply a DC voltage of around −5 kV.

Figure 9:
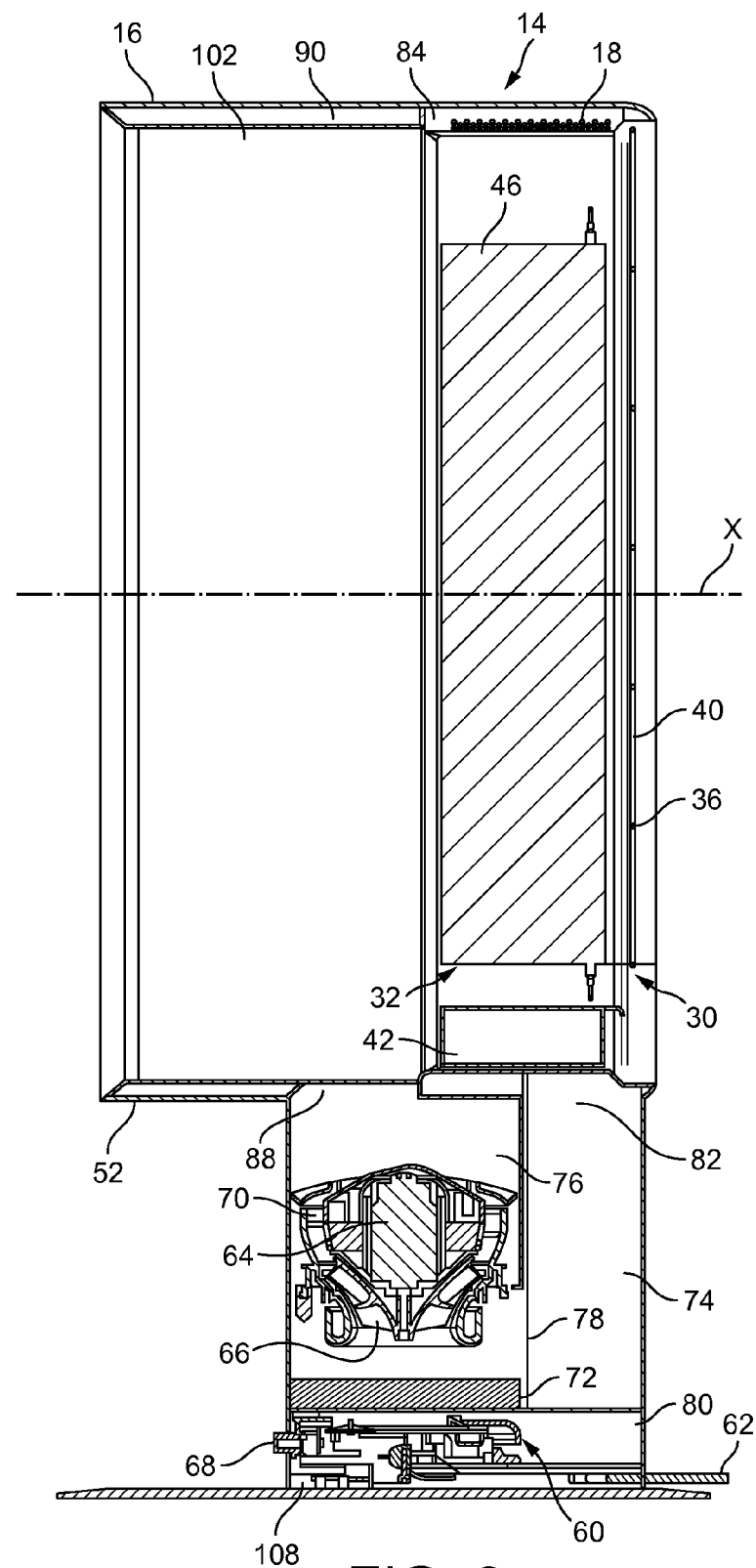
FIG. 9 is a side sectional view taken along line A-A in FIG. 4.

The cartridge 24 is inserted into the bore 20 of the nozzle 14 until the front end of the cartridge 24 abuts a stop member 50 located on an inner surface of the casing 16. The casing 16 comprises an outer wall 52 which extends about an annular inner wall 54. The inner wall 54 defines the bore 20 of the nozzle 14. In this example, the inner wall 54 comprises a front inner wall section 56 which is connected at one end to a front end of the outer wall 52 and at the other end to a rear inner wall section 58 which is integral with the outer wall 52. The stop member 50 is formed on the front end of the rear inner wall section 58. The rear inner wall section 58 comprises a first set of electrical contacts (not shown) which engage a second set of electrical contacts located on the outer surface of the cartridge 24 when the cartridge 24 is fully inserted into the bore 20 of the nozzle 14. With reference to FIG. 9, the contact between the electrical contacts couples the voltage sources provided in a main control circuit 60 of the base 12 to the electrostatic precipitator 22. A mains power cable 62 for supplying electricity to the main control circuit 60 extends through an aperture formed in the base 12. The cable 62 is connected to a plug (not shown) for connection to a mains power supply.

The main control circuit 60 is connected to a motor 64 for driving an impeller 66 for drawing air through the air inlets 18 and into the fan 10. Preferably, the impeller 66 is in the form of a mixed flow impeller. The motor 64 is preferably a DC brushless motor having a speed which is variable by the main control circuit 60 in response to user manipulation of a dial 68. The motor 64 is housed within a motor bucket which comprises a diffuser 70 downstream from the impeller 66. The diffuser 70 is in the form of an annular disc having curved blades. The motor 64 is connected to the main control circuit 60 by a cable which passes from the main control circuit 60 to the motor 64 through the diffuser 70. The motor bucket is located within, and mounted on, a generally frusto-conical impeller housing, which is in turn mounted on a plurality of angularly spaced supports connected to the base 12. Preferably, the base 12 includes silencing foam for reducing noise emissions from the base 12. In this embodiment, the base 12 comprises a foam member 72 located beneath the impeller housing.

In this example, the base 12 comprises a first air passageway 74 located in a rear section of the base 12 for receiving a primary air flow from the nozzle 14, and a second air passageway 76 located in a front section of the base 12 for returning the primary air flow to the nozzle 14 for emission through the air outlets of the nozzle 14. The primary air flow passes through the air passageways 74, 76 in generally opposite directions. The primary air flow passes from the first air passageway 74 to the second air passageway 76 through an aperture 78 located at the lower ends of the air passageways 74, 76. The motor 64 and the impeller 66 are preferably located in the second air passageway 76. The main control circuit 60 is located in a lower chamber 80 of the base 12 which is isolated from the primary air flow passing through the base 12. Cables extend through an aperture in the lower chamber 80 to connect the main control circuit 60 to the motor 64 and to the electrical contacts located on the inner wall 54 of the nozzle 14.

The primary air flow enters the first air passageway 74 of the base 12 through an air outlet port 82 located at the lower end of the outer wall 52 of the nozzle 14. The nozzle 14 comprises a first air passage 84 for conveying air from the air inlets 18 to the air outlet port 82. The first air passage 84 is located between the outer wall 52 and the rear inner wall section 58 of the inner wall 54. In this embodiment the first air passage 84 is in the form of a loop surrounding both the bore 20 of the nozzle 14 and the electrostatic precipitator 22 inserted within the bore 20. However, the first air passage 84 may not extend fully about the bore 20, and so may comprise a plurality of sections which merge at the air outlet port 82 and which each convey air from a respective air inlet 18 to the air outlet port 82.

As illustrated in FIG. 10, optionally the first air passage 84 may comprise means for treating the primary air flow drawn into the fan 10 through the air inlets 18. The air treating means may comprise one or more air filters, which may be formed from one or more of HEPA, foam, carbon, paper, or fabric filter media. In this embodiment, the air passage 84 comprises two sets of parallel plates 86 each arranged in the first air passage 84 so as to be located between the air outlet port 82 and a respective air inlet 18. A voltage may be supplied to one of the plates of each set of parallel plates 86 by the second voltage source located within the cartridge 24, and again electrical contact may be established between the plates and the second voltage source when the cartridge 24 is fully inserted into the bore 20 of the nozzle 14. Alternatively, this voltage may be supplied directly by the main control circuit 60 located within the base 12. The charging section 30 of the electrostatic precipitator 22 may be arranged to charge particulates within the primary air flow upstream from the plates 86. For example, nozzles 36 of the charging section 30 may be arranged to emit ions into the primary air flow, for example through apertures provided on the rear inner wall section 58.

The nozzle 14 comprises an air inlet port 88 for receiving the primary air flow from the second air passageway 76 of the base 12. The air inlet port 88 is also located in the lower end of the outer wall 52 of the casing 16. The air inlet port 88 is arranged to convey the primary air flow into a second air passage of the nozzle 14. In this embodiment, the second air passage comprises an annular inlet section 90 located between the outer wall 52 and front inner wall section 56 of the casing 16 for receiving the primary air flow from the base 12. The inlet section 90 of the second air passage is isolated from the first air passage 84 by an annular partitioning wall 92 extending between the outer wall 52 and the inner wall 54.

The second air passage further comprises two elongate outlet sections 94 for receiving air from the inlet section 90. Each outlet section 94 is defined by a respective tubular wall 96 located within a front section of the bore 20, in front of the electrostatic precipitator 22. Each tubular wall 96 extends across the bore 20 of the nozzle 14, between a lower end of the front inner wall section 56 and an upper end of the front inner wall section 56. Each wall 96 has an open upper end and an open lower end each for receiving air from the inlet section 90 of the second air passage. The tubular walls 96 are located side by side within the bore 20 of the nozzle 14, and each extend in a direction which is orthogonal to the central axis X of the bore 20.

An air outlet 98 is formed in the front end of each tubular wall 96. Each air outlet 98 is arranged to emit air away from the electrostatic precipitator 22, preferably in a direction which is substantially parallel to the direction in which air passes through the air channels 48 located between the plates 46 of the electrostatic precipitator 22.

Alternatively, the orientation of the plates 46 or the walls 96 may be adjusted so that the air outlets 98 are angled to the air channels 48 located between the plates 46 of the electrostatic precipitator 22. For example, the plates 46 may be oriented so that the air outlets 98 are orthogonal to the air channels 48 located between the plates 46 of the electrostatic precipitator 22. Each air outlet 98 is preferably in the form of a slot extending in a direction which is orthogonal to the central axis X of the bore 20. Each slot extends substantially the entire length of each tubular wall 96, and has a uniform width of 1 to 5 mm along its length.

The front section of the bore 20 is divided into two equal half sections 100 by a dividing wall 102 which extends through the centre of the bore 20, and between the upper end and the lower end of the front section of the bore 20. FIG. 10 illustrates a top sectional view of the fan 10, as viewed in a plane containing the axis X of the bore 20 and located midway between upper and lower ends of the bore 20. With each section 100 of the bore 20, the air outlet 98 is located midway between the front inner wall section 56 and the dividing wall 102. Each air outlet 98 is also located behind the front end of the bore 20, preferably so that an angle θ subtended between a first line $L_1$, extending from the air outlet 98 towards the front end of the bore 20 and parallel to the axis X of the bore 20, and a second line $L_2$, extending from the air outlet 98 to the front end 104 of the dividing wall 102, is in the range from 5 to 25°. In this embodiment the angle θ is around 15°.

To operate the fan 10 the user presses button 106 located on the base 12. A user interface control circuit 108 communicates this action to the main control circuit 60, in response to which the main control circuit 60 activates the motor 64 to rotate the impeller 66. The rotation of the impeller 66 causes a primary, or first, air flow to be drawn into the fan 10 through the air inlets 18. The user may control the speed of the motor 64 and therefore the rate at which air is drawn into the fan 10 through the air inlets 18, by manipulating the dial 68. Depending on the speed of the motor 64, the flow rate of an air flow generated by the impeller 60 may be between 10 and 40 litres per second.

The primary air flow is drawn through the first air passage 84 of the nozzle 14 and enters the base 12 through the air outlet port 82 of the nozzle 14. The primary air flow passes in turn through the first air passageway 74 and the second air passageway 76 in the base 12 before emitted from the base 12 through the air inlet port 88. Upon its return to the nozzle 14 the primary air flow enters the second air passage of the nozzle 14. Within the annular inlet section 90 of the second air passage, the primary air flow is divided into two air streams which are conveyed in opposite directions around a lower portion of the bore 20 of the nozzle 14. A first portion of each air stream enters a respective outlet section 94 through the open lower end of the tubular wall 96, whereas a second portion of each air stream remains within the annular inlet section 90. The second portion of the air stream passes about the bore 20 of the nozzle 14 to enter the outlet section 94 through the open upper end of the tubular wall 96. In other words, the outlet section 94 has two air inlets each for receiving a respective portion of an air stream. The portions of the air stream thus enter the outlet section 94 in opposite directions. The air stream is emitted from the outlet section 94 through the air outlet 98.

The emission of the air flow from the air outlets 98 causes a secondary air flow to be generated by the entrainment of air from the external environment. Air is drawn into the air flow through the bore 20 of the nozzle 14, and from the environment both around and in front of the nozzle 14. The air flow drawn through the bore 20 of the nozzle 14 passes through the charging section 30 and through the air channels 48 between the plates 46 of the collecting section 32 of the electrostatic precipitator 22. The secondary air flow combines with the air flow emitted from the nozzle 14 to produce a combined, or total, air flow, or air current, projected forward from the fan 10.

To remove particulates from the air drawn through the bore 20 of the nozzle 14, the user activates the electrostatic precipitator 22 by pressing button 110 located on the base 12. The user interface control circuit 108 communicates this action to the main control circuit 60, in response to which the main control circuit 60 activates the voltage sources located within the base 12. The first voltage source supplies the first DC voltage to the needle-like electrodes connected to the nozzles 36 of the charging section 30, and the second voltage source supplies the second DC voltage to alternate plates of the collecting section 32. The pump is also activated, for example by one of the voltage sources or directly by the main control circuit 60, to supply fluid to the nozzles 36 of the charging section 30. If one or more pairs of plates are also located within the first air passage 84 within the nozzle 14, then the second DC voltage may also be supplied to one of the plates of each pair of plates.

The generation of a high electric charge within the fluid located within the nozzles 36 causes the fluid to be ionized and sprayed spontaneously from the nozzle apertures and through the apertures 38. The emitted ions disperse and interact with particulates within the air drawn through the bore 20 as it passes through the charging section 30, and, where at least one of the nozzles 36 is arranged to emit ions into the first air passage 84, within the primary air flow. Within the cartridge 24, as the air passes through the air channels 48 located between the plates 46 of the collecting section 32 the charged particulates are attracted to and collect on the charged plates 46, whereas within the first air passage 84 the charged particulates are attracted to and collect on the charged plates located in the first air passage 84.

A second embodiment of a fan 200 including an electrostatic precipitator is illustrated in FIGS. 11 to 16. Similar to the fan 10, the fan 210 comprises a base 212 and a nozzle 214 mounted on the base 212. While the nozzle 214 also comprises an annular casing 216, an air inlet 218 through which a primary air flow is drawn into the fan 210 are now located in the base 212 of the fan 210. The air inlet 218 comprises a plurality of apertures formed in the base 212.

The base 212 comprises a substantially cylindrical main body section 220 mounted on a substantially cylindrical lower body section 222. The main body section 220 and the lower body section 222 preferably have substantially the same external diameter so that the external surface of the upper body section 220 is substantially flush with the external surface of the lower body section 222. The main body section 220 comprises the air inlet 218 through which air enters the fan assembly 10. The main body section defines a flow passageway 224 through which a primary air flow drawn through the air inlet 218 during operation of the fan 210 flows towards the nozzle 214.

The lower body section 222 is isolated from the air flow passing through the upper body section 220. The lower body section 222 includes the same user-operable buttons 106, 110, dial 68 and user interface control circuit 108 as the fan 10. The mains power cable 62 for supplying electricity to the main control circuit 60 extends through an aperture formed in the lower body section 222. The lower body section 222 also houses a mechanism, indicated generally at 226, for oscillating the main body section 220 relative to the lower body section 222, and includes a window 228 through which signals from a remote control (not shown) enter the fan 210.

The main body section 220 houses the mechanism for drawing the primary air flow into the fan 210 through the air inlet 218. The mechanism for drawing the primary air flow into the fan 210 is the same as that used in the fan 10, and so will not be described again in detail here. A filter may be provided within the base 212, or around the air inlet 218, to remove particulates from the primary air flow.

The nozzle 214 comprises an annular outer casing section 230 connected to and extending about an annular inner casing section 232. Each of these sections may be formed from a plurality of connected parts, but in this embodiment each of the outer casing section 230 and the inner casing section 232 is formed from a respective, single moulded part. The inner casing section 232 defines the bore 236 of the nozzle 214. The mesh grilles 26, 28 are connected to the front and rear ends of the nozzle 214.

The outer casing section 230 and the inner casing section 232 together define an annular air passage 238 of the nozzle 214. Thus, the air passage 238 extends about the bore 236.

The air passage 238 is bounded by the internal peripheral surface of the outer casing section 230 and the internal peripheral surface of the inner casing section 232. The outer casing section 230 comprises a base 240 which is connected to the base 212 of the fan 210. The base 240 of the outer casing section 230 comprises an air inlet port 242 through which the primary air flow enters the air passage 238 of the nozzle 214.

The air outlet 244 of the nozzle 214 is located towards the rear of the fan 210. The air outlet 244 is defined by overlapping, or facing, portions of the internal peripheral surface of the outer casing section 230 and the external peripheral surface of the inner casing section 232. In this example, the air outlet 244 is substantially annular and, as illustrated in FIG. 16, has a substantially U-shaped cross-section when sectioned along a line passing diametrically through the nozzle 214. In this example, the outer casing section 230 and the inner casing section 232 are shaped so that the air passage 238 tapers towards the air outlet 244. The air outlet 244 is in the form of an annular slot, preferably having a relatively constant width in the range from 0.5 to 5 mm.

The charging section 30 of the electrostatic precipitator 22 is housed within the air passage 238 of the nozzle 214. In this embodiment, the electrostatic precipitator is not located within a removable cartridge 24, but is instead permanently housed within the nozzle 214. The nozzles of the charging section 30 are located adjacent to apertures 246 located in a rear, inner section of the outer casing section 230 that defines a rear section of the bore 236 of the nozzle 214 so as to spray ions through the apertures 246 and into the air drawn into the bore 236. The fluid reservoir 42 for supplying fluid to the nozzles of the charging section 30 is located in a lower part of the bore 236. The first voltage source may also be located within the lower part of the bore 236 or in the lower body section 222 of the base 212. The collecting section 32 of the electrostatic precipitator 22 is housed within the bore 236 of the nozzle 214. Again, the second voltage source may be located within the lower part of the bore 236 or in the lower body section 222 of the base 212.

To operate the fan 210, the user presses button 106 located on the base 212. A user interface control circuit 108 communicates this action to the main control circuit 60, in response to which the main control circuit 60 activates the motor 64 to rotate the impeller 66. The rotation of the impeller 66 causes a primary air flow to be drawn into the fan 210 through the air inlets 218 in the base 212. The air flow passes through the air passage 224 and enters the air passage 238 of the nozzle 214 through the air inlet port 242.

Within the air passage 238, the primary air flow is divided into two air streams which pass in opposite directions around the bore 236 of the nozzle 214. As the air streams pass through the air passage 238, air enters the tapering section of the air passage 238 to be emitted from the air outlet 244. The air flow into the tapering section of the air passage 238 is substantially even about the bore 236 of the nozzle 214. The primary air flow is directed by the overlapping portions of the outer casing section 230 and the inner casing section 232 over the external surface of the inner casing section 232 towards the front end of the nozzle 214. In this embodiment, the air outlet 244 is arranged relative to the electrostatic precipitator 22 so as to emit air around the collecting section 32 of the electrostatic precipitator 22.

As with the first embodiment, the emission of the air flow from the air outlet 244 causes a secondary air flow to be generated by the entrainment of air from the external environment. Air is drawn into the air flow through the bore 236 of the nozzle 214, and from the environment both around and in front of the nozzle 214. The air flow drawn through the bore 236 of the nozzle 214 passes through the charging section 30 and through the air channels between the plates 46 of the collecting section 32 of the electrostatic precipitator 22. The secondary air flow combines with the air flow emitted from the nozzle 214 to produce a combined, or total, air flow, or air current, projected forward from the fan 210.

To remove particulates from the air drawn through the bore 236 of the nozzle 214, the user activates the electrostatic precipitator 22 by pressing button 110 located on the base 212 of the fan 210. The removal of the particulates from the air drawn through the bore 236 of the nozzle 214 is performed in a similar manner to the removal of the particulates from the air drawn through the bore 20 of the nozzle 14; as the air passes through the bore 236 particulates within the air are charged by the emission of ions from the nozzles 36 of the charging section 30 of the electrostatic precipitator 22, and are collected on the plates 46 of the collecting section 32 of the electrostatic precipitator 22.

In either of the fans 10, 210 the collecting section 32 of the electrostatic precipitator 22 may be omitted so that the fan 10, 210 includes only the charging section 30 for charging particulates within the air drawn through the bore of the nozzle. This can convert the electrostatic precipitator 22 into an air ionizer which treats the air drawn through the bore of the nozzle.

The invention claimed is:

1. A fan comprising:

a base comprising an impeller and a motor for driving the impeller; and a nozzle connected to the base, the nozzle comprising at least one air inlet, at least one air outlet, a casing defining a bore through which air from outside the fan is drawn by air emitted from said at least one air outlet, and an electrostatic precipitator located within the casing for treating the air drawn through the bore.

2. The fan of claim 1, wherein the electrostatic precipitator is located at least partially within the bore of the nozzle.

3. The fan of claim 1, wherein at least part of the electrostatic precipitator is housed within a cartridge removable from the bore of the nozzle.

4. The fan of claim 1, wherein the electrostatic precipitator comprises a plurality of parallel plates extending across the bore of the nozzle.

5. The fan of claim 1, wherein said at least one air outlet is arranged to emit air away from the electrostatic precipitator.

6. The fan of claim 1, wherein the nozzle has a front end towards which air is emitted from said at least one air outlet, and a rear end opposite to the front end, and wherein said at least one air outlet is located between the front end and the rear end.

7. The fan of claim 6, wherein the electrostatic precipitator is located between said at least one air outlet and the rear end of the nozzle.

8. The fan of claim 1, wherein said at least one air outlet extends across the bore of the nozzle.

9. The fan of claim 1, wherein said at least one air outlet comprises a plurality of air outlets, each air outlet extending across the bore of the nozzle.

10. The fan of claim 9, wherein each air outlet is in the form of a slot.

11. The fan of claim 9, wherein the air outlets are substantially parallel.

12. The fan of claim 1, wherein the nozzle comprises at least one air passage for conveying air from said at least one air inlet towards said at least one air outlet.

13. The fan of claim 12, wherein at least part of said at least one air passage extends at least partially about the electrostatic precipitator.

14. The fan of claim 12, wherein said at least one air passage comprises an air treating unit for treating air drawn into the fan through said at least one air inlet.

15. The fan of claim 14, wherein the air treating unit comprises an air filter.

16. The fan of claim 12, wherein said at least one air inlet is arranged to admit air into the fan.

17. The fan of claim 16, wherein the nozzle comprises an air outlet port for conveying air to the base, and an air inlet port for receiving air from the base.

18. The fan of claim 17, wherein said at least one air passage comprises a first air passage for conveying air from said at least one air inlet to the air outlet port, and a second air passage for conveying air from the air inlet port to said at least one air outlet.

19. The fan of claim 18, wherein at least part of the second air passage extends across the bore of the nozzle.

20. The fan of claim 19, wherein said at least part of the second air passage extends in a direction orthogonal to a central axis of the bore.

21. The fan of claim 18, wherein the second air passage comprises a plurality of sections each extending across the bore of the nozzle, and said at least one air outlet comprises a plurality of air outlets, each air outlet being located in a respective section of the second air passage.

* * * * *